US010733632B2

(12) United States Patent
Harris

(10) Patent No.: US 10,733,632 B2
(45) Date of Patent: Aug. 4, 2020

(54) METHOD AND APPARATUS FOR VALIDATION OF TARGETED ADVERTISING DATA

(71) Applicant: Pernix, LLC, Austin, TX (US)

(72) Inventor: Stephanie Harris, Roslyn, NY (US)

(73) Assignee: Pernix, LLC, Austin, TX (US)

( * ) Notice: Subject to any disclaimer, the term of this patent is extended or adjusted under 35 U.S.C. 154(b) by 0 days.

(21) Appl. No.: 16/057,134

(22) Filed: Aug. 7, 2018

(65) Prior Publication Data
US 2020/0051129 A1  Feb. 13, 2020

(51) Int. Cl.
*G06Q 30/00* (2012.01)
*G06Q 30/02* (2012.01)

(52) U.S. Cl.
CPC ..... *G06Q 30/0273* (2013.01); *G06Q 30/0283* (2013.01)

(58) Field of Classification Search
None
See application file for complete search history.

(56) References Cited

U.S. PATENT DOCUMENTS

| 2008/0307262 | A1* | 12/2008 | Carlin, III | G06F 16/215 714/37 |
| 2009/0287595 | A1* | 11/2009 | Hanifi | G06Q 30/00 705/37 |
| 2012/0290373 | A1* | 11/2012 | Ferzacca | G06Q 10/00 705/14.7 |
| 2016/0125474 | A1* | 5/2016 | Hoffman | G06Q 30/0274 705/14.64 |

OTHER PUBLICATIONS

Google.com, Data discrepancies between AdWords and Analytics, Feb. 1, 2017—https://web.archive.org/web/20170201220938/https://support.google.com/analytics/answer/1034383?hl=en, 5 pps (Year: 2017).*

* cited by examiner

*Primary Examiner* — Michael W Schmucker
(74) *Attorney, Agent, or Firm* — Ira Stickler, Esq.

(57) ABSTRACT

A system is disclosed comprising: a memory and at least one processor operatively coupled to the memory, the at least one processor being configured to: present a user interface for registering an advertiser with the system and specifying an attribution rule for calculating a fee that is owed by the advertiser to a first advertising platform; obtain an analytics report; generate an attribution report based on the analytics report and the attribution rule, the attribution report including an indication of a fee that is calculated based on the attribution rule; and transmit the attribution report to the first advertising platform.

16 Claims, 17 Drawing Sheets

| | Timestamp | Type | Transaction Amount | Publisher Commission | Advertising Platform Fee | Publisher ID | Publisher Medium ID | Advertisement ID | Transaction ID |
|---|---|---|---|---|---|---|---|---|---|
| 402a | 10/9/2017 | Sale | 300 | 25.00 | 10.00 | 554 | 7685 | 9325 | Order443 |
| 402b | 10/9/2017 | Sale | 400 | 30.00 | 12.00 | 936 | 1245 | 10313 | Order645 |
| 402c | 10/10/2017 | Sale | 500 | 35.00 | 15.00 | 936 | 1245 | 10313 | Order737 |
| 402d | 10/10/2017 | Sale | 200 | 20.00 | 8.00 | 78609 | 28864 | 532 | Order928 |

<ATTRIBUTION REPORT GENERATED BY ADVERTISING PLATFORM 321>

FIG. 4

| | Advertisiment ID | Advertising Platform | Medium | Transaction ID | Timestamp | Transaction Amount |
|---|---|---|---|---|---|---|
| 502a | 9325 | Adv. Platform 108 | Affiliate | Order443 | 20171009 | 300.00 |
| 502b | 987333 | SpringPromo | Email | Order737 | 20171010 | 500.00 |
| 502c | 98710 | Adwords | PPC | Order479 | 20171009 | 100.00 |
| 502d | 10313 | Adv. Platform 108 | Affiliate | Order645 | 20171009 | 400.00 |
| 502e | 93832 | MSNBC | Insertion Order | Order134 | 20171010 | 300.00 |
| 502f | 532 | Adv. Platform 108 | Affiliate | Order928 | 20171010 | 200.00 |

<3RD PARTY ANALYTICS REPORT GENERATED BY THIRD PARTY ANALYTICS PLATFORM 110>

———— ADVERTISER INFORMATION ————

ADVERTISER ID: [type text here] — 702

ERROR TYPES TO CHECK FOR: [▼] ERROR TYPE I / ERROR TYPE II / ERROR TYPE III
704

———— 3RD PARTY ANALYTICS PLATFORM INFORMATION ————

706
3RD PARTY ANALYTICS PLATFORM ID: [▼] GOOGLE ANALYTICS / ADOBE ANALYTICS / CLIENT DIRECT- EMAIL / CLIENT DIRECT - FTP

KEY: [type text here] — 708
PASSWORD: [type text here] — 710

———— ADVERTISING PLATFORM INFORMATION ————

ADVERTISING PLATFORM ID: [▼] ADVERTISING PLATFORM 108 / IR / PPJ / PHG
712
KEY: [type text here] — 714
PASSWORD: [type text here] — 716

———— SERVICE PERIOD ————

STARTING DATE: [MM/DD/YY] — 718
CLOSING DATE: [MM/DD/YY] — 720

726 — ADD RULE     724 — CANCEL     722 — CREATE PROFILE

FIG. 7

| | 408 | 410 | 416 | 418 | 420 | 412 | 414 | 404 | 406 |
|---|---|---|---|---|---|---|---|---|---|
| 1421A | Timestamp | Type | Transaction Amount | Publisher Commission | Advertising Platform Fee | Publisher ID | Publisher Medium ID | Advertisement ID | Transaction ID |
| 402a | 10/9/2017 | Sale | 300 | 25.00 | 10.00 | 554 | 7685 | 9325 | Order443 |
| 402b | 10/9/2017 | Sale | 400 | 30.00 | 12.00 | 936 | 1245 | 10313 | Order645 |
| 402c | 10/10/2017 | Sale | 500 | 35.00 | 15.00 | 936 | 1245 | 10313 | Order737 |
| 402d | 10/10/2017 | Sale | 200 | 20.00 | 8.00 | 78609 | 28864 | 532 | Order928 |

<EXTERNAL ADVERTISING PLATFORM REPORT GENERATED BY AVP 1312>

FIG. 15

METHOD AND APPARATUS FOR VALIDATION OF TARGETED ADVERTISING DATA

BACKGROUND

Technical Field

The present disclosure relates generally to electronic devices, and more particularly to targeted advertising.

Description of the Related Art

Online advertising is a form of marketing that uses the Internet to deliver promotional marketing messages to consumers. Typically, an online advertising system includes at least the following entities: a publisher, an advertiser, and an online advertising platform. As the name suggests, publishers may be entities that display online ads on their websites as a means of obtaining revenue. Advertisers may be businesses that benefit from the ads being displayed, and which pay a fee for the ads to be displayed. Advertising platforms may be entities that act as intermediaries that connect publishers to advertisers and determine the commissions which the advertisers owe the publishers. However, at times, advertising platforms may use incomplete data when calculating the commissions which advertisers owe to publishers and this may result in the commissions being calculated incorrectly. For this reason, the need exists for techniques, processes, and systems that verify the accuracy of commissions calculated by advertising platforms, as well as the accuracy of data used by the advertising platforms as a basis for the calculation of the commissions.

Nothing in the background section shall be construed as an admission of prior art unless otherwise noted.

SUMMARY

According to aspects of the disclosure, a system is provided comprising: a memory and at least one processor operatively coupled to the memory, the at least one processor being configured to: present a user interface for registering an advertiser with the system, the user interface including a first input component for inputting an identifier for a first advertising platform, a second input component for inputting an identifier for the advertiser, and a third input component for at least in part specifying an attribution rule that includes logic for calculating a fee that is owed by the advertiser to the first advertising platform; generate an advertiser profile including the identifier for the advertiser, the identifier for the first advertising platform, and the attribution rule, and store the advertiser profile in the memory; obtain an analytics report including a plurality of first transaction records, each first transaction record corresponding to a respective transaction and a respective advertisement associated with the respective transaction and the advertiser; generate an attribution report based on the analytics report and the attribution rule, the attribution report including a plurality of second transaction records, each of the second transaction records corresponding to a same transaction as at least one of the first transaction records, and each of the second transaction records including an indication of a fee that is owed to the first advertising platform by the advertiser, the fee being calculated by executing the attribution rule using information that is part of the analytics report; and transmit the attribution report to the first advertising platform.

According to aspects of the disclosure, a method is disclosed comprising presenting a user interface including a first input component for inputting an identifier for a first advertising platform, a second input component for inputting an identifier for an advertiser, and a third input component for at least in part specifying an attribution rule that includes logic for calculating a fee that is owed by the advertiser to the first advertising platform; generating an advertiser profile including the identifier for the advertiser, the identifier for the first advertising platform, and the attribution rule, and store the advertiser profile in a memory; obtaining an analytics report including a plurality of first transaction records, each first transaction record corresponding to a respective transaction and a respective advertisement associated with the respective transaction and the advertiser; generating an attribution report based on the analytics report and the attribution rule, the attribution report including a plurality of second transaction records, each of the second transaction records corresponding to a same transaction as at least one of the first transaction records, and each of the second transaction records including an indication of a fee that is owed to the first advertising platform by the advertiser, the fee being calculated by executing the attribution rule using information that is part of the analytics report; and transmitting the attribution report to the first advertising platform.

BRIEF DESCRIPTION OF THE DRAWINGS

FIG. 4 is a diagram of an example of an attribution report, according to aspects of the disclosure;

FIG. 5 is a diagram of an example of an analytics report, according to aspects of the disclosure;

FIG. 7 is a diagram of an example of a form that is part of a user interface of the attribution verification platform shown in FIG. 3, according to aspects of the disclosure;

FIG. 15 is a diagram of an example of an attribution report, according to aspects of the disclosure;

DETAILED DESCRIPTION

According to one aspect of the disclosure, an attribution verification platform (AVP) is provided that verifies billing statements and other records which an advertising platform issues to an advertiser. The AVP may include an online frontend where the advertiser can register with the AVP and provide: (i) a first credential for retrieving performance metrics relating to the advertising platform, which may include the billing reports or statements from the advertising platform, and (ii) second credential for retrieving an analytics report from an analytics provider. The AVP may then use the first credential to retrieve a billing statement from the advertising platform. In addition, the AVP may use the second credential to retrieve the analytics report from the analytics provider. Afterwards, the AVP may use the analytics report to confirm the accuracy of charges and other data that are listed in the billing statement issued by the advertising platform. When errors are detected, the AVP may notify the advertiser or advertising platform of the errors in order to prevent the advertiser from being overcharged. It should be understood that although this description describes retrieving billing reports or statements that other metrics for determining performance of publishers and advertisements on the advertising platform may be utilized and would remain within the scope and spirit of the present disclosure.

According to another aspect of the disclosure, an attribution verification platform (AVP) is provided that generates billing statements on behalf of an advertiser. The AVP may include an online frontend where the advertiser can register with the AVP and provide one or more attribution rules that are used for calculating commissions and advertising platform fees resulting from the presentation of one or more advertisements on behalf of the advertiser. In operation, the AVP may retrieve an analytics report from an analytics provider and use information that is provided in the analytics report to generate a billing statement based on the attribution rules. In some respects, using attribution rules that are provided directly by the advertiser may help ensure the accuracy of any billing reports generated by the AVP and prevent the advertiser from being overcharged.

Figure 1:
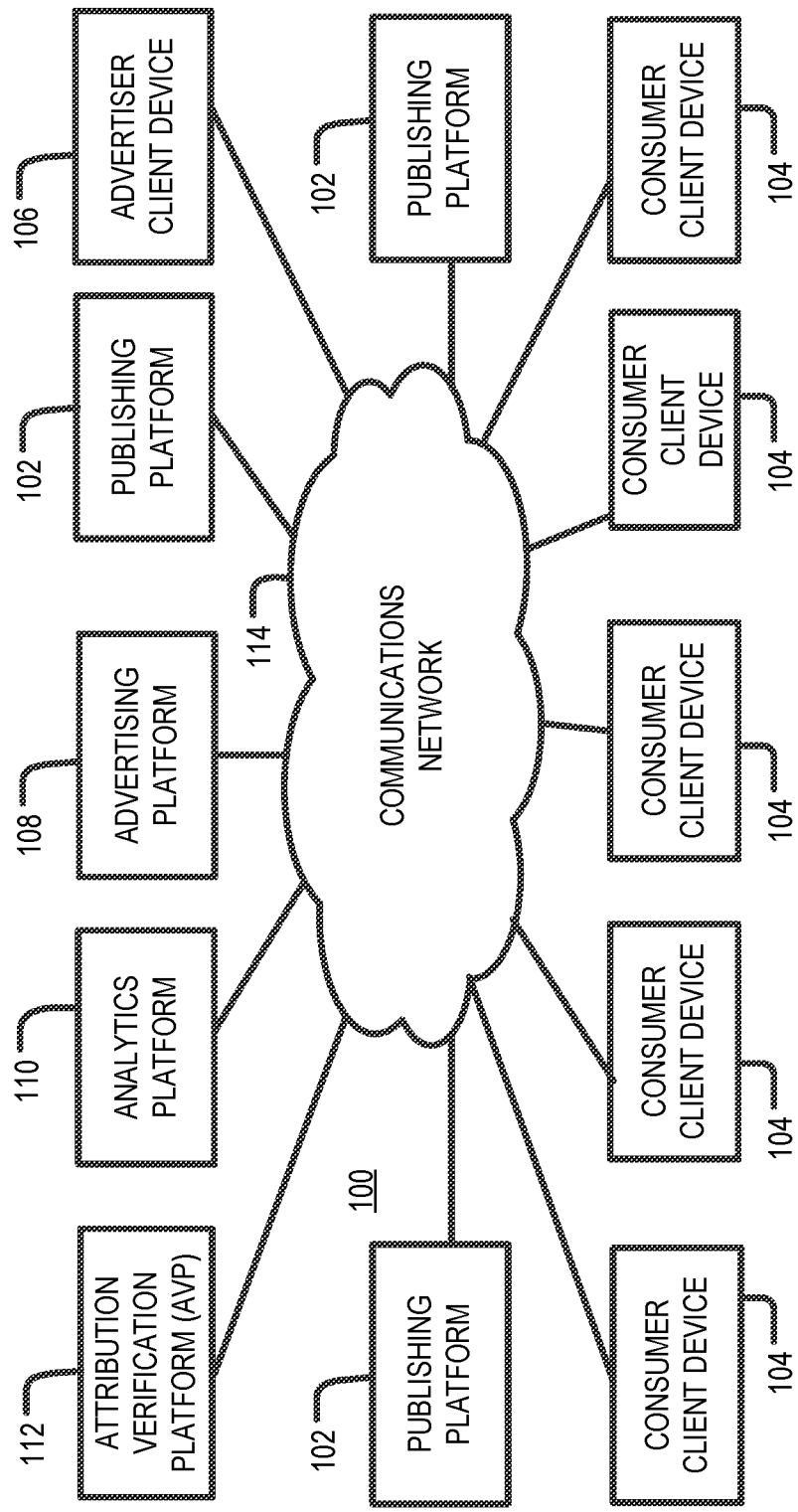
FIG. 1 is a diagram of an example of a system, according to aspects of the disclosure.

FIG. 1 is a diagram of an example of a system 100, according to aspects of the disclosure. As illustrated, the system 100 may include one or more publishing platforms 102, one or more client devices 104, an advertiser client device 106, an advertising platform 108, an analytics platform 110, and an analytics verification platform (AVP) 112 that are connected to one another via a communications network 114. The communications network 114 may include one or more of the Internet, a local area network (LAN), a wide area network (WAN), telephone network, a cellular network, a cable TV distribution network, and/or any other suitable type of network. Although in the present example, the communications network 114 is the Internet, it will be understood that the present disclosure is not limited to any specific type of network (or networks) for connecting the nodes in the system 100 to one another. For example, in some implementations, the communications network 114 may be a restricted-access network, such as the network of a cable TV provider that is used for the distribution of cable TV among a plurality of subscribers.

The publishing platforms 102 may include various platforms for the distribution of content over the communications network 114. Any of the publishing platforms 102 may include one or more servers that are configured to provide original content, as well as advertisements alongside the original content. As noted above, any of the publishing platforms 102 may include a news website, an online gaming provider, a video streaming service, an audio streaming service, and/or any other suitable type content provider. The plurality of client devices 104 may include one or more of a smartphone, a desktop computer, a smart appliance (e.g., a refrigerator), an automotive entertainment system, a digital media player, and/or any other suitable type of device.

Any of the client devices 104 may be configured to receive content and accompanying advertisements from one or more of the publishing platforms 102 and present (e.g., display or otherwise render) the content and advertisements to a user. Any of the advertisements may include at least one of a still image, a video clip, a sound clip, etc. In some implementations, any of the advertisements, when selected by the user, may include a URL and/or another address embedded in it. When the advertisement is selected by the user, the advertisement may cause the client device 104 displaying the advertisement to open a web page belonging to an advertiser associated with the advertisement, where the user can complete a transaction, such as a purchase of a product and/or subscription for a service. As used throughout the disclosure, the phrase "selecting an advertisement" may include any action that causes the client device 104 presenting the advertisement to execute a link, address, and/or other code that is present on the advertisement and display a website or another portal where the user can complete a transaction. In some implementations, an advertisement may be selected by clicking on the advertisement. Additionally or alternatively, in some implementations, an advertisement may be selected via voice command or by activating a button (or another input component) associated with the advertisement. Any of the client devices 104 may be implemented using at least some of the hardware shown in FIG. 2, which is discussed further below.

The advertiser client device 106 may include an electronic device for interacting with the advertising platform 108 and the AVP 112. The advertiser client device 106 may include a laptop, a desktop, a smartphone, and/or any other suitable type of computing device. In operation, the advertiser client device 106 may be configured to establish a connection with the advertising platform 108 and transmit a request for the display of one or more advertisements on any of the publishing platforms 102. In response to the request, the advertising platform 108 may connect to at least one publishing platform 102 and cause the publishing platform 102 to display one or more advertisements on behalf of the advertiser associated with the advertiser client device 106.

The advertising platform 108 may include one or more servers that are configured to act as an intermediary between the publishing platform and the advertiser. More particularly, the servers may be configured to perform at least some of the following tasks: (i) receive, over the communications network 114, an order for the placement of an advertisement from the advertiser client device; (ii) cause at least one of the publishing platforms 102 to display the advertisement; (iii) obtain or collect analytics identifying one or more events (e.g., transactions) that are associated with the advertisement; (iv) generate a report based on the analytics that identifies one or more commissions and fees that are payable by the advertiser as a result of the events having occurred;

(v) transmit the report to the advertiser client device 106 (or another device) for review by the advertiser; and (vi) receive a payment from the advertiser that is remitted using the advertiser client device 106 (or another device).

The analytics platform 110 may include one or more servers that are configured to collect and provide analytics related to the presentation of advertisements placed by the advertising platform 108 on one or more publishing platforms 102. The analytics platform 110 may be the same or similar to the GOOGLE ANALYTICS system that is currently fielded by GOOGLE, and the ADOBE ANALYTICS system fielded by ADOBE.

The AVP 112 may include one or more servers that are configured to receive the report generated by the advertising platform, receive an analytics report provided by the analytics platform 110, compare the two reports to identify errors in the report issued by the advertising platform, and act to prevent the advertiser from being overcharged as a result of the errors. In some implementations, the action may include generating a supplemental report that lacks the errors that are present in the report generated by the advertising platform but is otherwise the same or similar to the report generated by the advertising platform. Additionally or alternatively, in some implementations, correcting the errors may include transmitting an indication of the errors to at least one of the advertising platform 108 and the advertiser client device 106 (and/or another device that is associated with the advertiser). Additionally or alternatively, in some implementations, correcting the errors may include transmitting corrected data (e.g., corrected commission amounts, etc.) that is intended to replace incorrect data (e.g., incorrect commission amounts) that is part of the report provided by the advertising platform 108.

Figure 2:
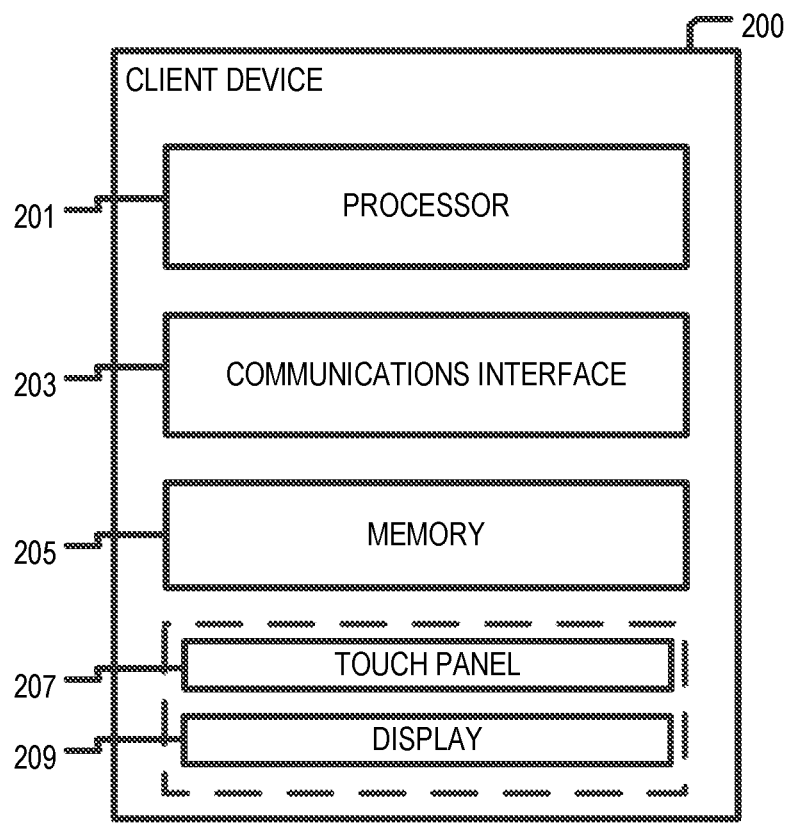
FIG. 2 is a diagram of an example of a client device, according to aspects of the disclosure.

FIG. 2 is a diagram of an example of a client device 200, according to aspects of the disclosure. As discussed above, the client device 200 may be the same or similar to the any of the client devices 104 and/or the advertiser client device 106. More particularly, the client device 200 may include a processor 201, a communications interface 203, a memory 205, a touch panel 207, and a display 209. According to aspects of the disclosure, the processor 201 may include any suitable type of processing circuitry, such as a general-purpose processor (e.g., an ARM-based processor), an application-specific integrated circuit (ASIC), or a Field-Programmable Gate Array (FPGA). The communications interface 203 may include any suitable type of communications interface, such as a Wi-Fi interface, an Ethernet interface, a Long-Term Evolution (LTE) interface, a Bluetooth Interface, an Infrared interface, etc. The memory 205 may include any suitable type of volatile and non-volatile memory, such as random-access memory (RAM), read-only memory (ROM), flash memory, cloud storage, or network accessible storage (NAS), etc. The touch panel 207 may include any suitable type of touch panel, such as a capacitive or resistive touch panel. The display 209 may include any suitable type of display such as a liquid crystal display (LCD), a light-emitting diode (LED) display, or an active-matrix organic light-emitting diode (AMOLED) display. In some implementations, the touch panel 207 may be layered onto the display 209 to form a touchscreen. Although not shown, the client device 200 may include additional (or alternative) input devices, such as a microphone, a keyboard, a mouse, etc.

Figure 3:
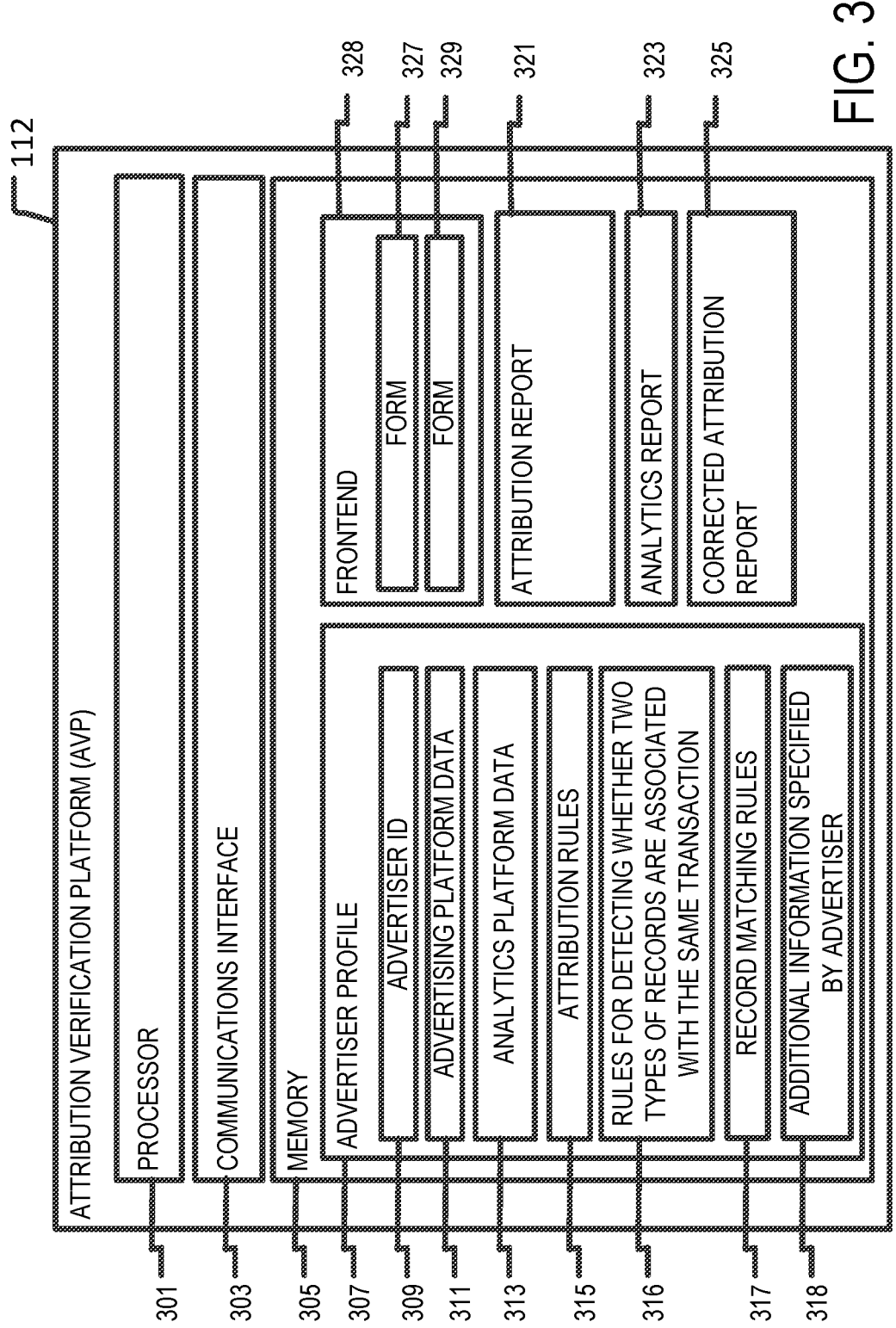
FIG. 3 is a diagram of an example of an attribution verification platform, according to aspects of the disclosure.

FIG. 3 is a diagram of an example of the AVP 112. As illustrated, the AVP 112 includes a processor 301, a communications interface 303, and a memory 305. According to aspects of the disclosure, the processor 301 may include any suitable type of processing circuitry, such as a general-purpose processor (e.g., an ARM-based processor), an application-specific integrated circuit (ASIC), or a Field-Programmable Gate Array (FPGA). The communications interface 303 may include any suitable type of communications interface, such as a WiFi interface, an Ethernet interface, a Long-Term Evolution (LTE) interface, a Bluetooth Interface, an Infrared interface, etc. The memory 305 may include any suitable type of volatile and non-volatile memory, such as random-access memory (RAM), read-only memory (ROM), a hard disk (HD), a solid-state drive (SSD), a CD-ROM, flash memory, cloud storage, or network accessible storage (NAS).

In some implementations, the memory 305 may store an advertiser profile 307. The advertiser profile 307 may include an advertiser ID 309, an advertising platform data record 311, an analytics platform data record 313, one or more attribution rules 315 associated with the advertiser, and one or more rules 316 for detecting whether a record in an attribution report and one or more records in an analytics report are both associated with the same transaction, one or more rules for 317 for detecting whether a record in the attribution report is invalid, and additional information 318 specified by the advertiser when the advertiser profile 307 is created. As is further discussed with respect to FIGS. 7 and 8, the additional information may include an identification of a period during which the advertiser will be provided with a service by the AVP 112 and an indication of one or more types of errors which will be detected when a report issued by the advertising platform 108 is validated by the AVP 112.

The advertiser ID 309 may include at least one of a number, a string, or an alphanumerical string that is capable of identifying an advertiser who has signed up for the service(s) provided by the AVP 112. The advertiser may be a person, a business, a charity, and/or any other entity that has signed up with the advertising platform 108 to place online ads with various publishing platforms 102 that operate on the communications network 114.

The advertising platform data record 311 may include one or more of an ID corresponding to the advertising platform 108 and one or more credentials for retrieving an attribution report 321 from the advertising platform 108. The advertising platform ID may include any suitable number, string, and/or alphanumerical identifier that is capable of identifying the advertising platform 108. In some implementations, the advertising platform ID may include a URL and/or another type of address that can be used to connect to the advertising platform 108 and retrieve the attribution report 321 (which is generated by the advertising platform 108). The advertising platform credentials may include one or more of a username, a secure key, a password, and/or any other suitable type of credential that is needed by the AVP 112 to authenticate itself before the advertising platform 108 in order for it to be permitted to retrieve the attribution report 321 from the advertising platform 108.

The analytics platform data record 313 may include one or more of an ID corresponding to the analytics platform 110 and one or more credentials for retrieving an analytics report 323 from the analytics platform 110. The analytics platform ID may include any suitable number, string, and/or alphanumerical identifier that is capable of identifying the analytics platform 110. In some implementations, the analytics provider ID may include a URL and/or another type of address that can be used by the AVP 112 to connect to the analytics platform 110 and retrieve the analytics report 323 (which is generated by the analytics platform 110). The advertising platform credentials may include one or more of a username, a secure key, a password, and/or any other suitable type of credential that is needed by the AVP 112 to authenticate itself before the analytics platform 110 before it is permitted to retrieve the analytics report from the analytics platform. Although in the present example, the analytics report 323 is downloaded by the AVP 112 from the analytics platform 110 using a URL-based API, the present disclosure is not limited to any specific method for retrieving the analytics report 323. For example, the analytics report 323 may be downloaded by the AVP 112 from an FTP server or pushed onto the AVP 112 by the advertising platform 110, without the AVP 112 having to request it beforehand.

The attribution rules 315 may include one or more rules for attributing commissions that are due to be paid by the advertiser for transactions that have resulted from the presentation of advertisements on any of the publishing platforms 102. Additionally or alternatively, the attribution rules 315 may include one or more rules for attributing fees payable to the advertising platform 108 for the placement of advertisements on any of the publishing platforms 102.

In some implementations, any of the attribution rules may include logic for calculating a fee that is owed by the advertiser to the advertising platform 108. In some implementations, the logic may include a mathematical expression. Additionally or alternatively, in some implementations, the logic may include one or more processor-executable instructions (e.g., a script), which when executed by at least one processor causes the at least one processor to calculate the fee. In some implementations, the processor-executable instructions may include at least two different expressions (e.g., conditional expressions) for calculating the fee. For example, the first expression may provide for the fee to be calculated using a first formula (which is a function of a first transaction attribute value), when the first transaction attribute value is available in the analytics report 323. As another example, the second expression may provide for the fee to be calculated using a second formula (which is a function of a second transaction attribute value, and which does not use the first attribute value), when the first transaction attribute value is not available in the analytics report 323 and the second transaction attribute value is available in the analytics report 323.

Additionally or alternatively, in some implementations, any of the attribution rules may include logic for calculating a commission that is owed by the advertiser to one or more publishing platforms. In some implementations, the logic may include a mathematical expression. Additionally or alternatively, in some implementations, the logic may include one or more processor-executable instructions (e.g., a script), which when executed by at least one processor causes the at least one processor to calculate the commission. In some implementations, the processor-executable instructions may include at least two different expressions (e.g., conditional expressions) for calculating the commission. For example, the first expression may provide for the commission to be calculated using a first formula (which is a function of a first transaction attribute value), when the first transaction attribute value is available in the analytics report 323. As another example, the second expression may provide for the commission to be calculated using a second formula (which is a function of a second transaction attribute value, and which does not use the first attribute value), when the first transaction attribute value is not available in the analytics report 323 and the second transaction attribute value is available in the analytics report 323.

In some implementations, any of the attribution rules 315 may identify a publisher that is entitled to a commission on a transaction resulting from the presentation of an advertisement by the publisher. Additionally or alternatively, in some implementations, the attribution rule 315 may specify under what circumstances the publisher is entitled to a commission. For example, the attribution rule may specify that the publisher is entitled to a commission when the publisher has generated the last click (or other selection) leading to the completion of a transaction. As another example, the attribution rule may specify that the publisher is entitled to a commission when the publisher has generated any of the last 5 (or another number) of clicks (or other selections) leading to the completion of the transaction. Additionally or alternatively, the attribution rule may specify the amount of the commission. For instance, the attribution rule may specify that the publisher is entitled to a full commission. As another example, the attribution rule may specify that the publisher is entitled to a split commission or no commission at all. According to the present disclosure, the term "split commission" may be used to describe instances in which a publisher is entitled to only a portion of the commission that is available for a transaction, while one or more other publishers are entitled to receive the remainder of the commission.

Examples of attribution rules for a given advertiser may include:
(i) award the publisher the full commission when an ad presented by the publisher has generated the last click (or another type of selection) in a stream of clicks (or other selections) leading to the completion of a transaction;
(ii) award the publisher a split commission when an ad presented by the publisher has generated the last click (or another type of selection) in a stream of clicks (or other selections) leading to the completion of a transaction;
(iii) award the publisher the full commission when an ad presented by the publisher has generated the first click (or another type of selection) in a stream of clicks (or other selections) leading to the completion of a transaction;
(iv) award the publisher the full commission when an ad presented by the publisher has generated a click (or another type of selection) at another position in a stream of clicks (or other selections) leading to the completion of a transaction;
(v) award the publisher a split commission when an ad presented by the publisher has generated a click (or another type of selection) at another position in a stream of clicks (or other selections) leading to the completion of a transaction;
(vi) award the publisher full commission when an ad presented by the publisher has generated a click leading to the completion of a transaction; and
(vii) award the publisher a split commission when an ad presented by the publisher has generated a click (or another type of selection) leading to the completion of a transaction.

The rules 316 for detecting whether a first record in an attribution report matches a second record in an analytics report are directed to the same transaction may include one or more of the following rules:
(i) the first record and the second record are considered directed to the same transaction only when they both include the same transaction ID;
(ii) the first record and the second record are considered directed to the same transaction only when they include matching transaction IDs;
(iii) the first record and the second record are considered directed to the same transaction only when they both include the same timestamp;
(iv) the first record and the second record are considered directed to the same transaction only when they include matching timestamps;

(v) the first record and the second record are considered directed to the same transaction only when they both include the same timestamp;
(vi) the first record and the second record are considered directed to the same transaction only when they include matching timestamps;
(vi) the first record and the second record are considered directed to the same transaction only when they both include the same attribute (e.g., timestamp, transaction ID, seller ID, store ID, transaction type ID, etc.); and
(vii) the first record and the second record are considered directed to the same transaction only when the first record includes a first attribute that matches a second attribute in the second record.

The rules 317 may include one or more rules specifying when a given record 402 in the attribution report 321 (shown in FIG. 4) matches one or more corresponding records 502 in the analytics report 323 (shown in FIG. 5) that are directed to the same transaction as the given record 402. According to the present example, when the value of an attribute of the transaction that is identified by the given record 402 does not match the value for the same attribute of the same transaction that is provided (or otherwise indicated) by the corresponding records 502, the given record 402 is said to contain an error. By way of example, any of the rules 317 may provide one or more of the following:
(i) the given record 402 is considered to contain an error when the given record 402 and the corresponding records 502 identify different commission amounts;
(ii) the given record 402 is considered to contain an error when the given record 402 and the corresponding records 502 identify different publishers as the recipients of a commission;
(iii) the given record 402 is considered to contain an error when the corresponding records 502 indicate that the transaction represented by the given record 402 is attributable to an advertising platform other than the advertising platform which generated the attribution report 321;
(iv) the first transaction record is invalid when the first transaction record and the second transaction record identify different transaction amounts; and
(v) the given record 402 is considered to contain an error when the given record 402 and the corresponding records 502 include differing timestamps.

As used throughout the disclosure the term "rule" may include any suitable type of representation of logic for verifying whether a condition is true. In this regard, any of the rules 316-318 may be represented a number, a string, an alphanumerical string, a regular expression, a conditional expression, and/or one or more processor-executable instructions, which when executed by at least one processor cause the at least one processor. According to aspects of the disclosure, two attribute values may be considered to match notwithstanding any differences in formatting. In instances in which two differently-formatted attribute values are compared one another, one of the attribute values may be converted to the formatting of the other before the attribute values are compared to determine whether they match. Additionally or alternatively, in some implementations, two attribute values may match when they are the same. Additionally or alternatively, in some implementations, two attribute values may match when they are within a predetermined distance from one another. For instance, two transaction amounts may match one another if they differ by no more than 10% of the value of the larger transaction amount. As another example, two timestamps may match one another if they are within two hours from one another. As yet another example, two publisher IDs may match one another if they have similar spelling (e.g., dot v. d0t).

The attribution report 321, as noted above, may be generated by the advertising platform 108. The attribution report 321 may include any suitable type of invoice, statement, bill, or other data that is issued by the advertising platform 108, and which identifies one or more transactions (and/or other events of interest) that have occurred as a result of an advertisement (or a plurality of different ads) being presented on one or more publishing platforms 102. Additionally or alternatively, the attribution report 321 may include an indication of any suitable metric of the performance of an advertisement which can be used by an advertiser to assess the value of the advertisement to the advertiser's business. As such, the attribution report 321 may or may not include indications of billable charges that are payable by an advertiser to one or more entities. As illustrated in FIG. 4, the attribution report 321 may include a plurality of records 402 that correspond to different respective transactions. Each of the transactions may be associated with the presentation of at least one advertisement on one of the publishing platforms 102 on behalf of the advertiser associated with the advertiser profile 307 (i.e., the advertiser identified by the advertiser ID 309). The advertisement may be placed on the publishing platforms 102 by the advertising platform 108. The attribution report 321 may thus be generated by the advertising platform 108 for the purpose of billing the advertiser for the advertisement presentation(s).

As illustrated, each record 402 may include the values for one or more attributes of the record's 402 respective transaction. More particularly, each record 402 may include: an advertisement ID 404 identifying the advertisement which the record 402 is associated with; a transaction ID 406 identifying the transaction which has been completed as a result of the advertisement being presented (e.g., displayed) to a viewer; a timestamp 408 identifying the time when the transaction was completed; a transaction type ID 410 identifying the type of the transaction; a publisher ID 412 identifying the publisher and/or publishing platform on which the advertisement was presented; a publisher medium ID 414 identifying the website (or another electronic medium) where the advertisement was presented; a transaction amount 416 identifying an amount of money paid for the transaction to be completed; a publisher commission 418 that is owed to the publisher for the completion of the transaction; and a fee 420 that is owed to the advertising platform 108.

The analytics report 323 may be generated by the analytics platform 110. In some implementations, the analytics report 323 may include data that is the same or similar to the data in the attribution report 321. Additionally or alternatively, in some implementations, the analytics report 323 may include data that is otherwise usable in verifying whether commission amounts and fees listed in the analytics report 323 are correct. Additionally or alternatively, in some implementations, the analytics report 323 may include data that is otherwise usable in verifying whether other attribute values listed in the analytics report 323 are correct.

Although in the present example, the analytics report 323 is retrieved by the AVP 112 from the analytics platform 110, in some implementations the analytics report may be generated by the AVP 112. More particularly, in some implementations, the AVP 112 may obtain two or more different analytics reports and stitch the reports together to produce the analytics report 323. The AVP 112 may stitch (or otherwise combine) the entire reports (or portions thereof) together to produce the analytics report 323. For example, in some implementations, the AVP 112 may generate the analytics report 323 by appending (or otherwise combining) at least a first portion of a first analytics report to at least a second portion of a second analytics report. In the present example, the first analytics report and the second analytics report are generated by different analytics platforms. However, alternative implementations are possible in which the first analytics report and the second report are generated by the same analytics platform.

The first portion of the first analytics report may be selected for inclusion in the analytics report 323 based on containing information about a transaction that is attributable to the presentation (or selection) of one or more advertisements associated with the advertiser associated with the profile 307. Specifically, the first portion of the first analytics report may be selected for inclusion in the analytics report 323 based on containing one or more first attribute values that are needed to apply one or more of the attribution rules 315.

The second portion of the second analytics report may be selected for inclusion in the analytics report 323 based on containing information about a transaction that is attributable to the presentation (or selection) of one or more advertisements associated with the advertiser associated with the profile 307. Specifically, the second portion of the second analytics report may be selected for inclusion in the analytics report 323 based on including one or more second attribute values that are needed to apply one or more of the attribution rules 315 in order to calculate a commission, an advertising platform fee, and/or another value for the transaction. The one or more second attribute values may be attribute values that are not present in the first analytics report.

Using the analytics report 323 may be advantageous because, in some instances, the advertising platform 108 may have relied on incomplete data when calculating the commissions and fees in the attribution report 321. In such instances, the analytics report 323 may be used to correct errors in the attribution report. One such error may occur when the advertising platform 108 is not aware of all advertisement clicks (or other selections) that form a stream leading to a transaction being completed because some of the clicks (or other selections) are generated by advertisements placed by other advertising platforms. In such instances, because the analytics report 323 may be more comprehensive than the data relied upon by the advertising platform 108, which is used as a basis for generating the adverting platform report 321. As a result, the analytics report 323 may reveal the entire stream of clicks (or other selections) that has lead to the transaction being completed, thereby exposing any errors in the commission amounts calculated by the advertising platform 108 resulting from the entire stream of clicks (or other selections) not being considered by the advertising platform 108.

Furthermore, using the analytics report 323 may be advantageous in situations in which the advertising platform 108 lacks the technical capability to collect the data necessary for the proper application of attribution rules agreed upon by the advertiser. For instance, an attribution rule may provide that a publisher is entitled to a commission when a particular shopper has selected an advertisement and/or completed a transaction. However, the advertising platform 108 may lack the capability to distinguish between different shoppers that use the same device and as a result it may incorrectly attribute a commission to the publisher. In such instances, because the analytics report 323 may be more comprehensive than the data relied upon by the advertising platform 108, the analytics report 323 may be able to distinguish between different shoppers on the same device, thereby enabling the AVP 112 to calculate correct commission amount(s).

According to the present disclosure, the analytics report 323 may identify one or more transactions (and/or events of interest) that have occurred as a result of an advertisement (or a plurality of different ads) being presented on one or more publishing platforms 102. At least some of those transactions may be the same as the transactions identified in the attribution report 321. As illustrated in FIG. 5, the analytics report may include a plurality of records 502 that correspond to different respective transactions. Each of the transactions may be associated with the presentation of at least one advertisement on one of the publishing platforms 102 on behalf of the advertiser associated with the advertiser profile 307. The advertisements may be placed on the publishing platforms 102 by the advertising platform 108 or another advertising platform. As noted above, the analytics report 323 may be used by the AVP 112 for the purpose of independently tracking the performance of one or more advertisements that are placed on different publishing platforms 102 by the advertising platform 108 and/or other advertising platforms.

As illustrated in FIG. 5, each record 502 may include the values for one or more attributes of the record's 502 respective transaction. More particularly, each record 502 may include: an advertisement ID 504 identifying the advertisement which the record 502 is associated with; a transaction ID 506 identifying the transaction associated with the record, and which has been completed as a result of the advertisement being displayed; a timestamp 508 identifying the time when the transaction was completed; an advertising platform ID 510 identifying the advertising platform which has placed the advertisement on a given publishing platform; a transaction amount 512 identifying an amount of money paid for the transaction to be completed; and a medium ID 514 identifying the medium on which the advertisement was presented. Furthermore, alternative implementations are possible in which any record 402 includes other attribute values, not shown in FIG. 4, such as publisher ID, publisher commission, advertising platform fee, publisher name, etc.

Figure 6:
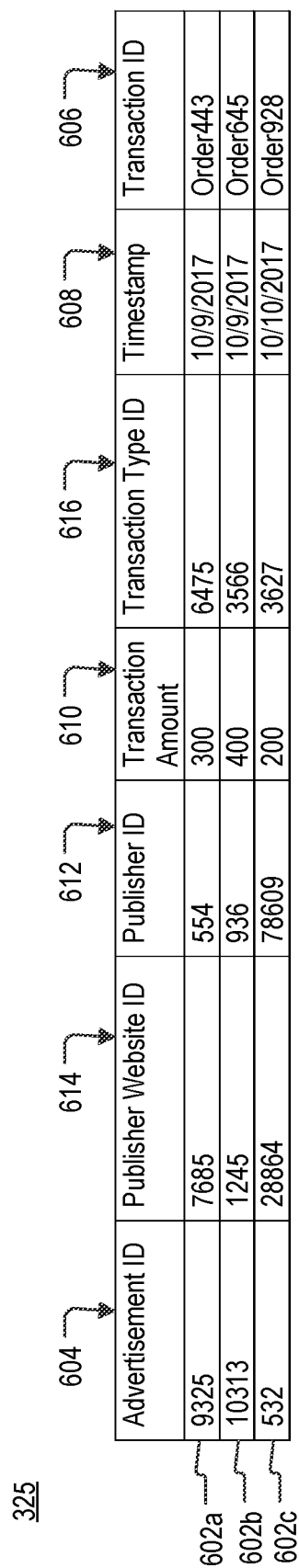
FIG. 6 is a diagram of an example of a corrected attribution report, according to aspects of the disclosure.

The corrected attribution report 325 may be generated by the processor 301 of the AVP 112 based on the attribution report 321 and the analytics report 323. As illustrated in FIG. 6, the corrected attribution report 325 may include a plurality of records 602. Each record 602 may correspond to a different transaction that is identified in the attribution report 321. However, no record 602 may correspond to a transaction whose respective record 402 contains errors. In other words, the corrected attribution report 321 does not include records for transactions for which the attribution report 321 provides incorrect information. The advertising report 321 may be considered to provide incorrect information of a transaction when the record 402 corresponding to the transaction contains at least one incorrect attribute value.

In the present example, the corrected attribution report 325 does not include a record corresponding to the transaction with order ID "Order737," because the record 402c, which corresponds to this transaction, is identified as invalid by the processor 301 based on the analytics report 323. The reason for the record being identified as invalid is that the record 502b, which corresponds to the same transaction, does not identify the advertising platform 108 as the source of the advertisement associated with transaction "Order737"; contrary to what is implied by the attribution report 321, the analytics report 323 identifies another advertising platform as the source of the record's associated advertisement. According to the present example, an advertising platform is considered the source of an advertisement if that advertising platform is the one that placed the advertisement on a publisher's platform.

As illustrated, each record 602 may include the values for one or more attributes of the record's 602 respective transaction. More particularly, each record 602 may include: an advertisement ID 604 identifying the advertisement which the record 602 is associated with; a transaction ID 606 identifying the transaction which has been completed as a result of the advertisement being presented; a timestamp 608 identifying the time when the transaction was completed; a transaction amount 610 identifying an amount of money paid to the advertiser (or an entity associated with the advertiser) for the transaction to be completed; a publisher ID 612 identifying the publisher on whose platform the advertiser was presented; a publisher medium ID 614; and a transaction type ID 616 identifying the type of the transaction.

In the present example, the record 602a corresponds to the same transaction as the record 402a, the record 602b corresponds to the same transaction as the record 402b, and the record 602c corresponds to the same transaction as the record 402d. In the present example, each record 602 includes fewer attributes values than its corresponding record 402. However, alternative implementations are possible, in which each record 602 includes the same or larger number of attribute values. According to aspects of the disclosure, a transaction record 602 may be considered to correspond to a transaction record 402 if and only if that transaction record 402 contains information regarding the same transaction as the transaction record 602.

Furthermore, in the present example, each record 602 includes attribute values that are identical to the attribute values found the record's 602 corresponding record 402. However, alternative implementations are possible in which any record 602 includes an attribute value that is different from the value for the same attribute that is found in the record's 602 corresponding record 402. For instance, in some implementations, the processor 301 may use one or more of the attribution rules 315 to determine that the record 402a contains an incorrect transaction amount, in which case it may insert a corrected transaction amount in the record 602a. As another example, the processor 301 may use one or more of the attribution rules 315 to detect that the commission identified in the record 402d should be attributed to another publisher, in such instances, the processor 301 may insert a different publisher ID and/or publisher website ID in the record 602c. Thus, in some implementations, the corrected attribution report may omit records for transactions that are attributable to advertising platforms other than the source of the attribution report 321 (e.g., advertising platform 108), while including corrected attribute values for transactions that are attributable to the source advertising platform (e.g., advertising platform 108).

Although in the present example, each of the reports 321-325 is depicted as a table, it will be understood that the disclosure is not limited to any specific way of representing and/or encoding the information found in the reports 321. In this regard, in some implementations, any of the reports 321 may be represented as a single data structure or multiple data structures. Additionally or alternatively, in some implementations, any of the reports 321-325 may be represented using a single file or by using multiple files. Although in the present example, each of the reports 321-325 includes multiple attribute values, alternative implementations are possible in which any of the reports includes only one attribute value for a given transaction (e.g., transaction ID). Furthermore, it will be understood that the any of the reports 321-325 may include any suitable type of data related to the presentation of advertisements, including, but not limited to, data that is normally collected by various analytics platforms and/or electronic marketers, such as number of clicks, number of impressions, etc.

The frontend 328 may include a plurality of processor-executable instructions, which when executed by the processor 301 cause the processor 301 to present to the advertiser client device 106 a web-based portal for accessing the functionality of the AVP. The web-based portal may include forms 327 and 329 which together form at least a part of the user interface of the AVP 112. To access the functionality of the AVP 112, the advertiser client device 106 may establish a connection with the AVP 112. Afterwards, the AVP 112 may present the user interface of the AVP 112 to the advertiser client device 106 by causing the advertiser client device 106 to display any of the forms 327 and 329. For example, the AVP 112 may transmit to the advertiser client device 106 HTML code, which when rendered on the advertiser client device 106 causes the advertiser client device 106 to display one or more of the forms 327 and 329. As another example, the AVP 112 may transmit to the advertiser client device an identifier (e.g., a number, string, or alphanumerical string) which when executed by the advertiser client device 106 causes the advertiser client device 106 to retrieve an instance of any of the forms 327 and 329 that is stored locally and render that form on the display of the device. Next, when any of the forms 327 and 329 is rendered on the advertiser client device 106, the user of the advertiser client device may fill the forms, after which the information that is entered into forms may be transmitted by the advertiser client device 106 to the AVP 112. Afterwards, the processor 301 may generate the advertiser profile 307 based on the information and store the advertiser profile in the memory 305.

FIG. 7 shows the form 327 in further detail. As illustrated, the form 327 may include user interface (UI) components 702-726. The UI component 702 may include a text input field (or another type of input component) for inputting the advertiser ID 309. The UI component 704 may include a drop-down menu, a text input field, and/or any suitable type of user interface component that can be used to specify one or more error types which the processor 301 should check for when processing the attribution report 321 to detect errors. In some implementations, the error types may include the following:

(i) Error Type I—occurs when a transaction listed in the attribution report 321 is incorrectly attributed to the advertising platform issuing the report (i.e., the advertising platform 108);

(ii) Error Type II—occurs when a transaction amount listed in any of the records 402 of the attribution report 321 is incorrect; and (iii) Error Type III—occurs when a transaction listed in the attribution report 321 is not attributed to the correct publisher.

The UI component 706 may include a drop-down menu or another type of input component for selecting an analytics platform. In the present example, the UI component 706 is used to select the analytics platform 110. The UI components 708 and 710 can be used to specify the credentials for accessing the services provided by the analytics platform 110. The UI components 708 and 710 may include text input fields, and the credentials specified in them can be used by the AVP 112 to receive the analytics report 323 from the analytics platform 110.

The UI component 712 may include a drop-down (or another type of input component) for selecting an advertising platform. In the present example, the UI component 712 is used to select the advertising platform 108. The UI components 714 and 716 can be used to specify the credentials for accessing the selected advertising platform. The UI components 714 and 716 may include text input fields, and the credentials specified in them can be used by the AVP 112 to receive the attribution report 321 from the advertising platform 108.

The UI component 718 and 720 can be used to specify the starting date and the ending date of a time period during which a validation services are to be provided by the AVP 112. The UI component 722 may include a button and/or another type of input component, which when selected causes the advertiser client device 106 to transmit the information entered into the form to the AVP 112. As noted above, upon receiving the information, the AVP 112 may create the advertiser profile 307 based on the information and store the advertiser profile 307 in the memory 305. The UI component 724 may include a button and/or another type of input component, which when selected causes the advertiser client device 106 to discard the information entered in the form 327.

Figure 8:
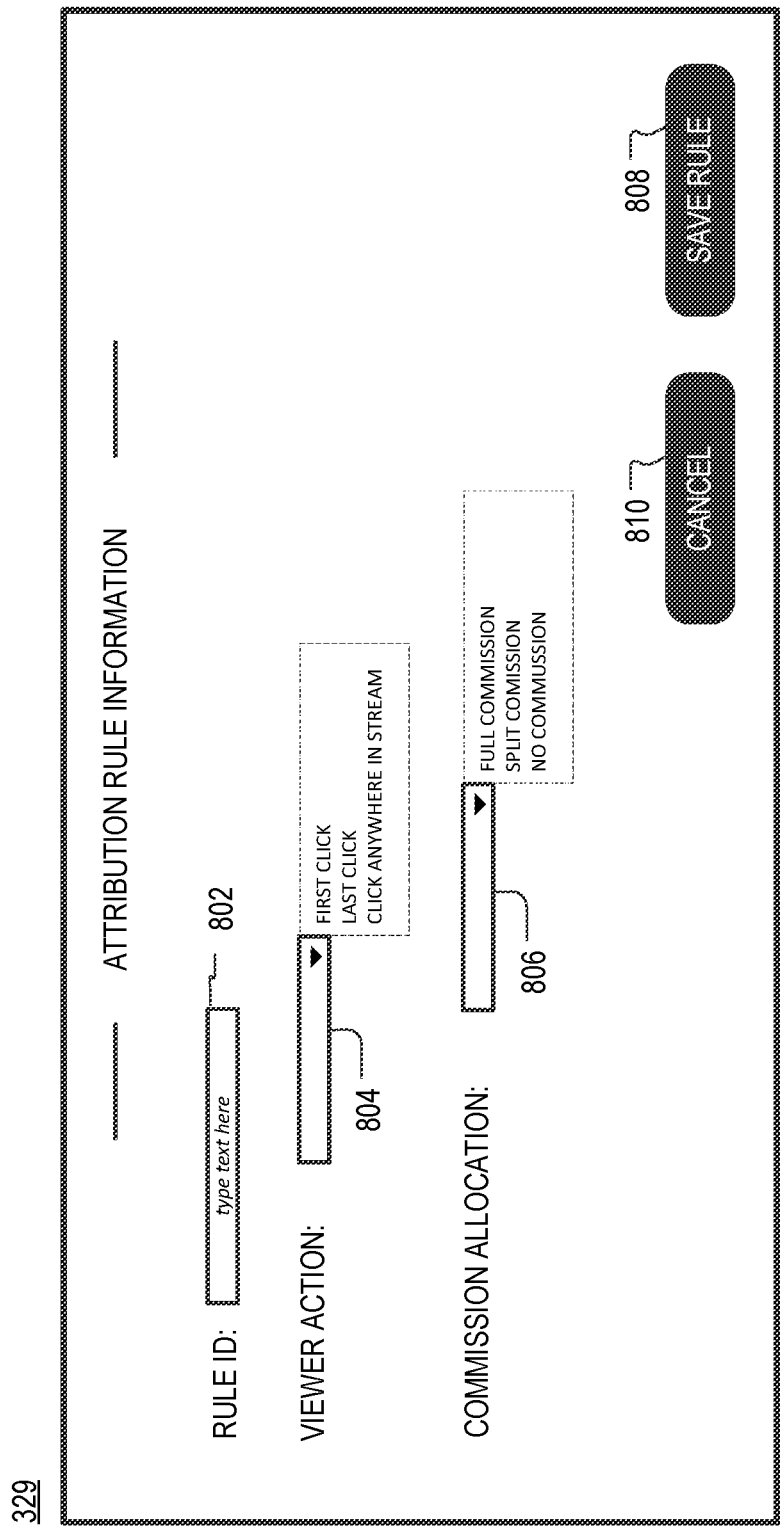
FIG. 8 is a diagram of an example of a form that is part of a user interface of the attribution verification platform shown in FIG. 3, according to aspects of the disclosure.

The UI component 726 may include a button or another type of input component which when selected causes the advertiser client device 106 to display the form 329, which is used for specifying one or more attribution rules. As illustrated in FIG. 8, the form may include UI components 802-810. The UI component 802 may include a text input field (or another type of input component) for specifying the ID of a publisher. The UI component 804 may include a drop-down menu which permits the user to select an event which that results in the publisher being awarded a commission on a transaction that is completed as a result of an advertisement being presented on the publisher's platform. As illustrated, the event may be one of (i) a first click in a stream of clicks that results in a transaction being completed, (ii) a last click in the stream of clicks that results in the transaction being completed, and (iii) a click anywhere in the stream of clicks.

The UI component 806 may include a drop-down menu (or another type of input component) for specifying the commission which the publisher is set to receive as a result of generating a click that results in a transaction being completed. In the present example, the UI component 804 permits the user to select one of "full credit," "split credit," and "no commission."

The UI component 808 may include a button (or another type of input component), which when selected causes the advertiser client device 106 to transmit the information entered into the form 329 to the AVP 112. Upon receiving the information, the AVP 112 may generate a representation of an attribution rule 315 and store it in the memory 305. The UI component 810 may include a button (or another type of input component), which when selected causes the advertiser client device 106 to discard the information entered into the form 329 and/or hide the form 329 from view.

Figure 9:
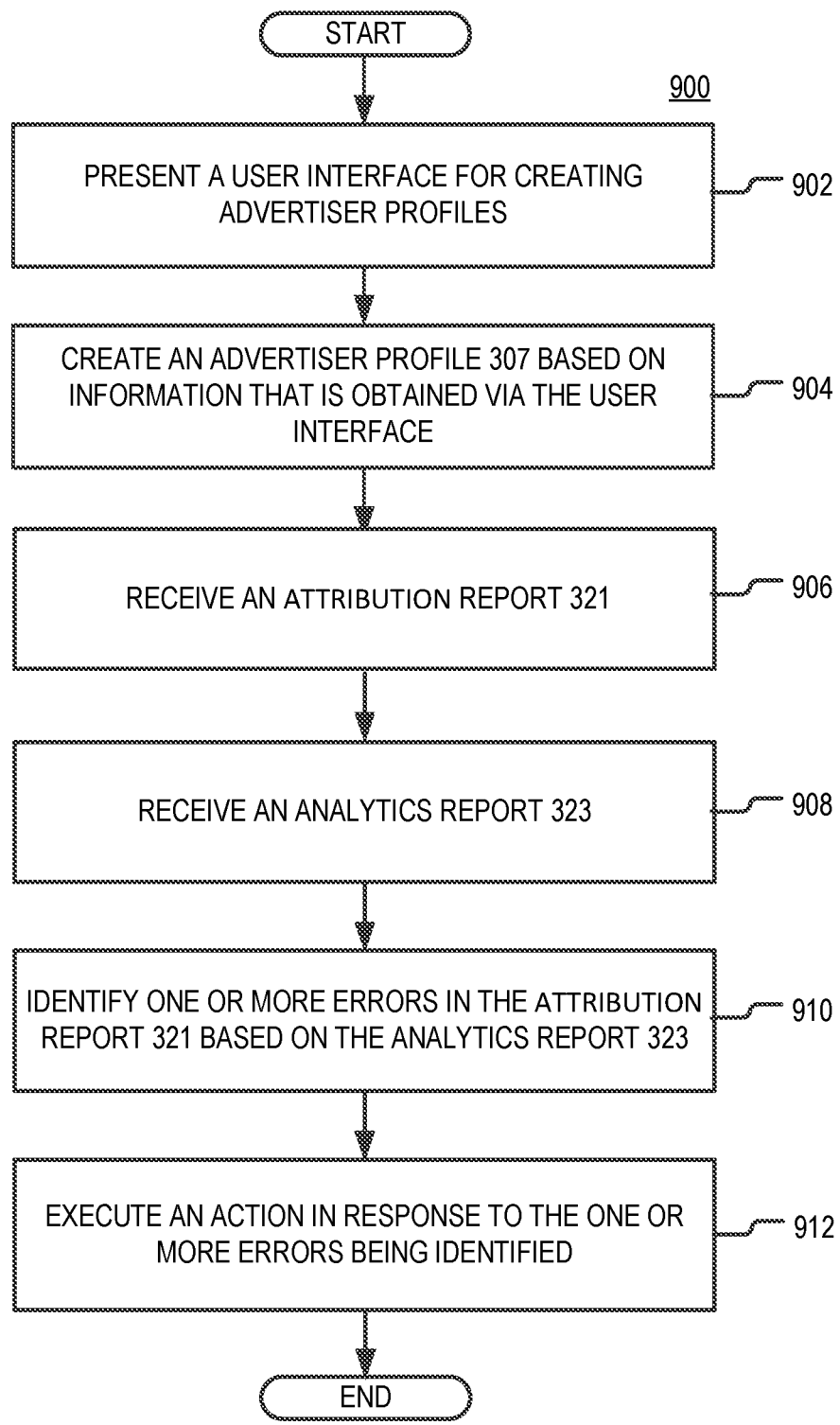
FIG. 9 is a flowchart of an example of a process, according to aspects of the disclosure.

FIG. 9 is a flowchart of an example of a process 900 performed by the AVP 112 according to aspects of the disclosure. At step 902, the AVP 112 presents to the client device 106 a user interface including a first input component for specifying a first credential and a second input component for specifying a second credential. In the present example, the AVP 112 causes the advertiser client device 106 display the forms 327 and/or 329, as discussed above.

At step 904, the advertiser profile 307 is created based on information that is input into the forms 327 and 329.

At step 906, the AVP 112 authenticates itself before the advertising platform 108 with the first credential and receives the attribution report 321 from the advertising platform 108. In some implementations, the attribution report 321 may be transmitted automatically to the AVP 112 without the AVP 112 having to transmit an explicit request. Additionally or alternatively, in some implementations, the attribution report 321 may be transmitted to the AVP 112 following the transmission of a request for it from the AVP 112 to the advertising platform 108.

At step 908, the AVP 112 authenticates itself before the analytics platform 110 with the second credential and receives the analytics report 323 from the analytics platform 110. In some implementations, the analytics report 323 may be transmitted automatically to the AVP 112 without the AVP 112 having to transmit an explicit request. Additionally or alternatively, in some implementations, the analytics report may be transmitted to the AVP 112 following the transmission of a request for it from the AVP 112 to the analytics platform 110.

At step 910, the AVP 112 identifies one or more errors in the in the attribution report 321 based on the analytics report 323.

At step 912, the AVP 112 performs an action in response to identifying the one or more errors. In some implementations, the action may include outputting an indication of at least one of the errors on an output device that is part of the AVP 112 (e.g., display screen, speaker, printer, etc.). Additionally or alternatively, in some implementations, the action may be one that prevents the advertiser associated with the advertiser profile 307 from being overcharged as a result of the errors. In some implementations, the action may include generating the corrected attribution report 325 and transmitting it to the advertising platform 108 for further processing. Additionally or alternatively, in some implementations, the action may include generating the corrected attribution report 325 and transmitting it to the advertising client device 106 (or another device associated with the advertiser) for further processing. Additionally or alternatively, in some implementations, the action may include transmitting an indication of at least one (or all) of the errors found in the attribution report 321 to the advertising platform 108. Additionally or alternatively, in some implementations, the action may include transmitting an indication of at least one (or all) of the errors found in the attribution report 321 to the advertising client device 106 (or another device associated with the advertiser). Additionally or alternatively, the action may include transmitting a request to a payment system to stop any pending payment associated with the attribution report 321). Additionally or alternatively, the action may include transmitting a request to a payment system to stop any pending payment for transactions whose respective records in the attribution report 321 contain errors.

Figure 10:
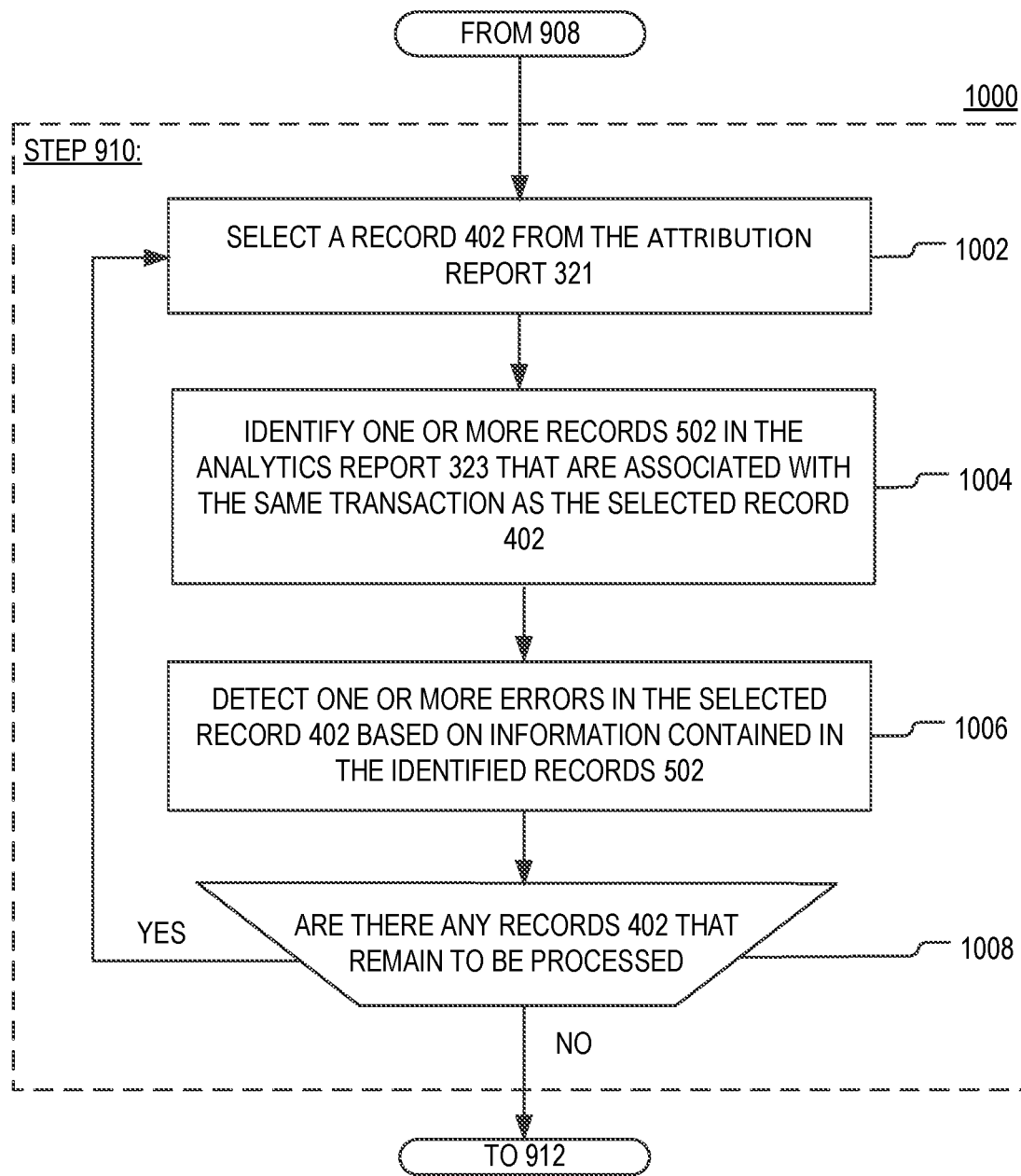
FIG. 10 is a flowchart of an example of example of a sub-process associated with the process of FIG. 9, according to aspects of the disclosure.

FIG. 10 is a flowchart of an example of a process 1000 for identifying errors in the attribution report 321 based on the analytics report 323, as discussed with respect to step 910 of the process 900. At step 1002, the AVP 112 selects one of the transaction records 402 in the attribution report 321. At step 1004, the AVP 112 identifies one or more records 502 in the analytics report that are directed to the same transaction as the selected record 402. In some implementations, the AVP 112 may use any of the rules 316 to identify the records 502 that are associated with the same transaction. At step 1006, the AVP 112 identifies one or more errors in the selected record 402 based information that is contained in the identified one or more records 502. In some implementations, the AVP 112 may detect that the selected record 402 contains an error when the record's respective transaction is attributed by the identified one or more records 502 to an advertising platform other than the advertising platform which has generated the selected record 402 (i.e., the advertising platform 108). Additionally or alternatively, in some implementations, the AVP 112 may determine that the selected record 402 contains an error when the information in the identified one or more records 502 indicate that one of the attribute values in the selected record 402 is incorrect. At step 1008, the AVP 112 determines whether there are any other records 402 in the attribution report 321 that remain to be processed. If there are, the process returns to step 1002 and another record is selected. If there are none, the process proceeds to step 912.

Figure 11:
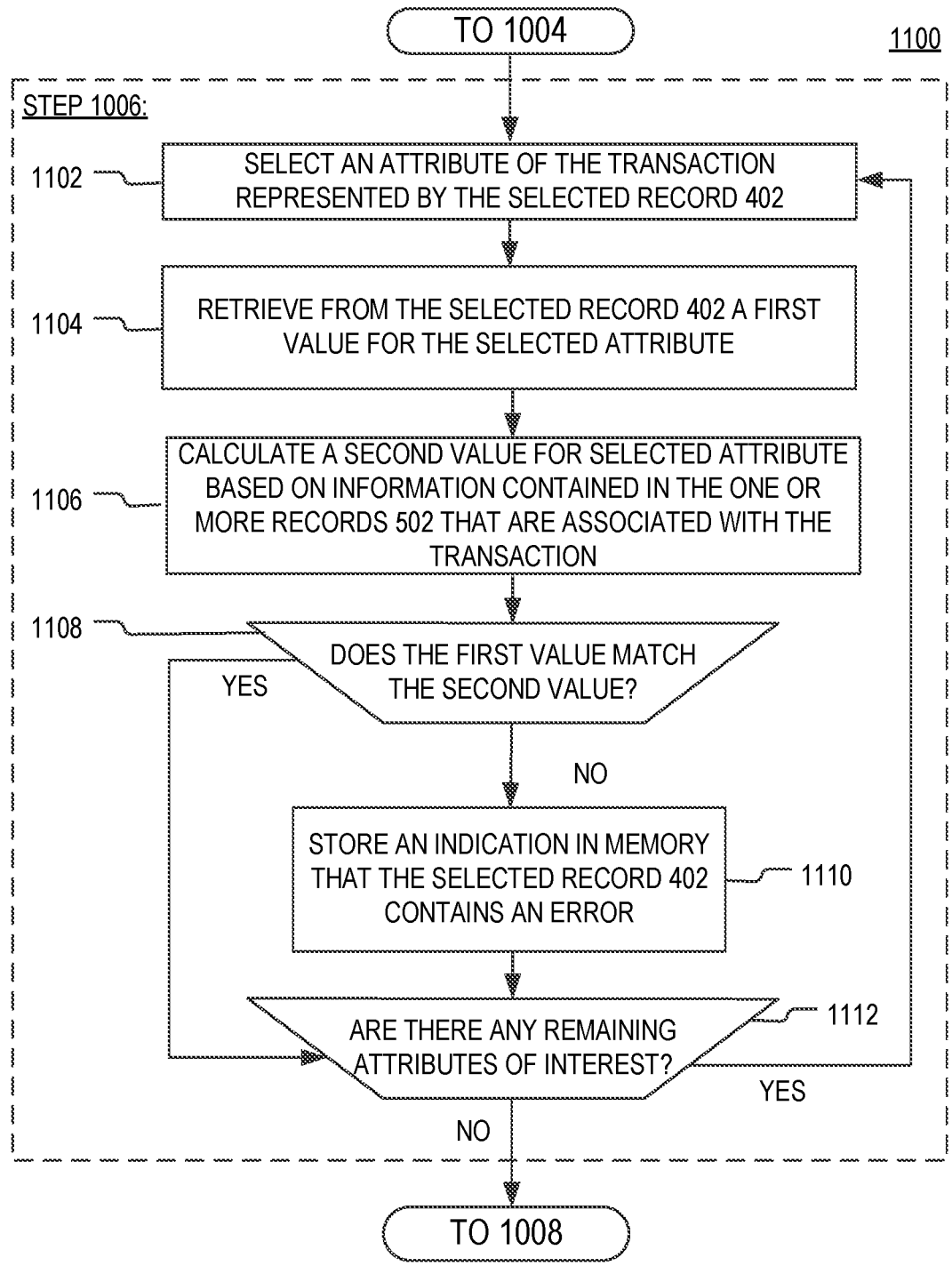
FIG. 11 is a flowchart of an example of a sub-process associated with the process of FIG. 9, according to aspects of the disclosure.

FIG. 11 is a flowchart of an example of a process 1100 for detecting that an attribute value in the selected record 402 is incorrect, as discussed above with respect to step 1006 of the process 1000.

At step 1102, the AVP 112 selects an attribute of the transaction associated with the selected record 402. The attribute may include any attribute of the transaction whose value is identified in the selected record 402. The attribute may be transaction amount, publisher commission, publisher ID, publisher website, etc. In some implementations, the attribute may be selected based on one or more error types that are specified by the advertiser. For example, when the advertiser has used the UI component 704 to select "Error Type II," the AVP 112 may select "Transaction Amount" as the attribute of interest. As another example, when the user has used the UI component 704 to select "Error Type III," the AVP 112 may select "Publisher ID" as the attribute of interest. In some implementations, the selection may have performed based on consulting a table (or another data structure) that is stored in the memory 305. The table may include a plurality of error type identifiers. In addition, for each error type identifier, the table may identify one or more attributes that end up having incorrect values when errors of this type occur. The table may or may not be part of the advertiser profile 307.

At step 1104, the AVP 112 identifies a first value for the attribute that is listed in the selected record 402.

At step 1106, the AVP 112 calculates a second value for the attribute based on one or more of the attribution rules 315 and information that is identified in the one or more records 502 that are identified at step 1004. As noted above, these records are associated with the same transaction as the selected record 402.

At step 1108, the first attribute value is compared to the second attribute value. If the first attribute value matches the second attribute value, the AVP 112 determines that the first attribute value is correct and the selected record 402 does not contain an error with respect to the attribute selected at step 1102. In this case, the process 1100 proceeds to step 1112. Otherwise, if the first attribute value does not match the second attribute value, the AVP 112 determines that the first attribute value is incorrect and the selected record 402 contains an error. In this case, the process proceeds to step 1110

At step 1110, the AVP 112 generates and stores in the memory 305 an indication of the error. In some implementations, the indication may include one or more of: an identifier of the record that contains the error (i.e., the selected record 402), an indication of the attribute whose value is incorrect, an indication of the correct value, at least some of the information obtained from the records 502 that is used in calculating the correct value, etc. In some implementations, the indication may be transmitted, at step 912, to the advertising platform 108 or another entity in order to prevent the advertiser from being overcharged as a result of the error.

At step 1112, the AVP 112 determines whether there are any remaining attributes of interest that remain to be processed. If there are, the process 1100 returns to step 1102. Otherwise, the process 1100 proceeds to step 1008.

In some implementations, the process 1100 may be used to recalculate the commission amount that is due to a particular publisher and determine whether the re-calculated amount matches the commission amount provided by the advertising platform 108. Additionally or alternatively, in some implementations, the process 1000 may be used to determine whether a publisher is correctly attributed a given transaction and/or entitled to a commission for the given transaction. If the attribution rules provide that the publisher identified in the selected record 402 is entitled to a commission only when that publisher has generated the last click (or another selection) in a stream of clicks (or other selections) leading to a transaction completed, and the one or more records 502, indicate that the publisher did not generate the last click in the stream, the AVP 112 may determine that this publisher is not owed commission for the transaction. Put simply, in the latter case, the one or more records 502 may be used to confirm the position of a click in a stream of clicks to determine whether the publisher that generated the click is owed a commission. As used throughout the disclosure, the term "stream" may refer to a sequence of consecutive clicks (or other selections) that are performed on different instances of the same advertisement that are presented to the same user at different times (e.g., displayed on the same device, displayed on the same device while a particular shopper is using it, etc.)

As noted about the processes 900, 1000 and 1100 may be performed by the AVP 112. Any of the steps in these processes may be executed by the processor 301 and/or another hardware component of the AVP 112. Although the AVP 112 is depicted in FIG. 3 as a monolithic device, it will be understood that the AVP 112 may include a single computing device (e.g., as illustrated in FIG. 3) or multiple computing devices. In the latter case, the processor 301 may include multiple processor which are operatively coupled to one another. Similarly, the memory 305 may include multiple storage devices that are situated at different locations.

In some implementations, the processes 900, 1000, and 1100 may be executed periodically by the AVP 112. Additionally alternatively, in some implementations, the processes 900, 1000, and 1100 may be executed asynchronously, in response to the AVP 112 detecting that it has received the attribution report 321 form the advertising platform 108 and/or the analytics report 323 from the analytics provider. In some implementations, the advertising platform 108 may automatically transmit to the AVP 112 any reports it generates for further validation. Additionally or alternatively, in some implementations, attribution reports that are generated by the advertising platform 108 may be forwarded to the AVP 112 by the advertiser client device 106 instead of being provided directly to the AVP 112 by the advertising platform 108.

Figure 12:
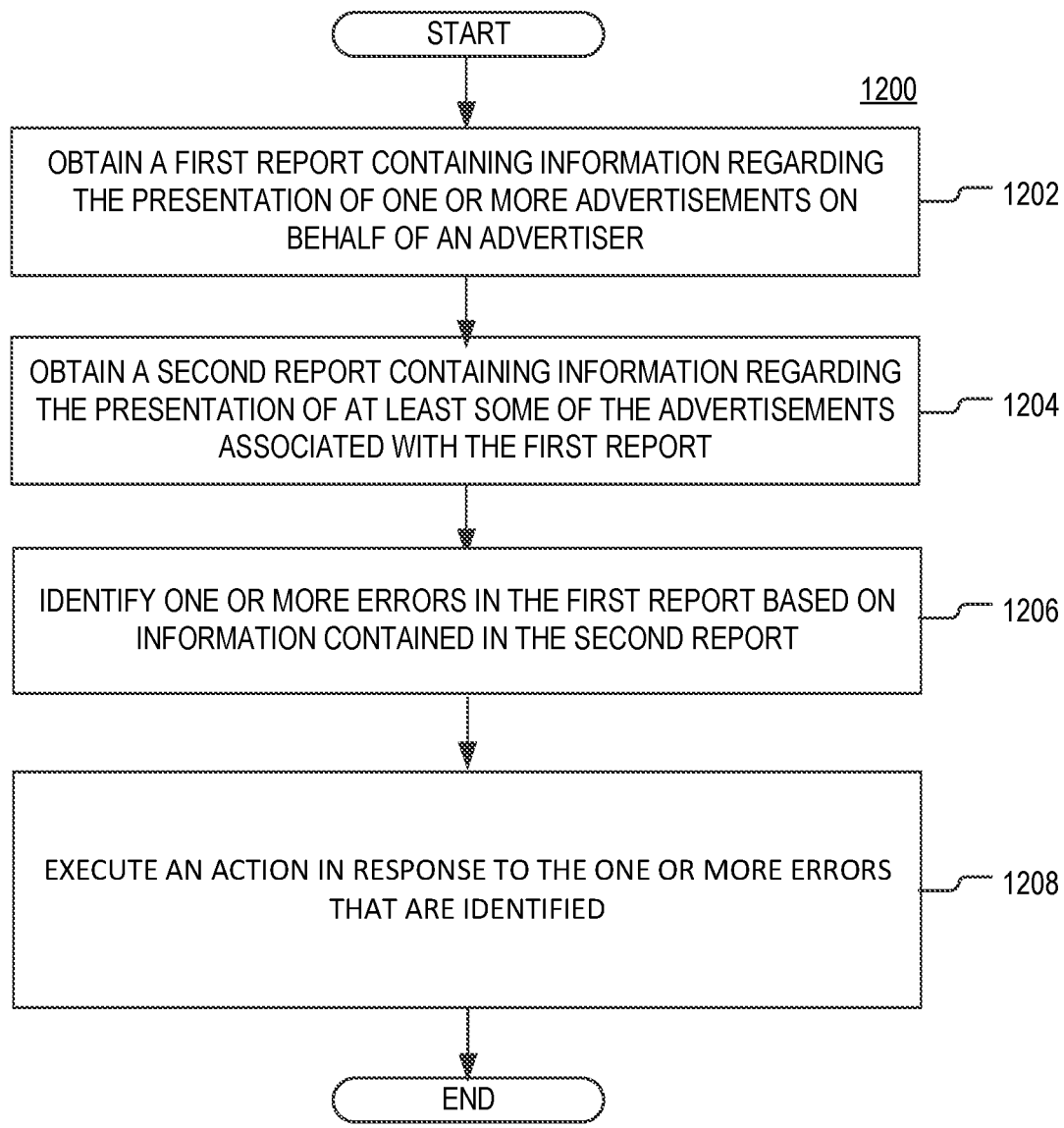
FIG. 12 is a flowchart of an example of a process, according to aspects of the disclosure.

FIG. 12 is a flowchart of an example of a process 1200, according to aspects of the disclosure. The process 1200 may be performed by any node in the system 100, such as the advertising platform 108, the analytics platform 110, the advertiser client device 106, and or any of the publishing platforms 102. In this regard, FIG. 12 illustrates that the concepts and processes discussed throughout the disclosure can be performed by any node at the system 100, and not only the AVP 112.

At step 1202, a first report identifying one or more transactions (or other events) is obtained. In some implementations, the first report may identify a respective transaction amount for each of the transactions. Additionally or alternatively, in some implementations, the first report may identify a respective commission for each of the transactions identified in it. Additionally or alternatively, in some implementations, the first report may identify a respective publisher that is to receive any of the commissions. Additionally or alternatively, in some implementations, the first report may identify a fee that is owed to a respective advertising platform that is affiliated with any of the publishers that are set to receive a commission. Additionally or alternatively, in some implementations, the first report may be the same or similar to the attribution report 321. The first report may be received from the advertising platform 108 or another source.

At step 1204, a second report identifying one or more transactions (or other events) is obtained. In some implementations, the second report may identify some or all of the transactions identified in the first report. Additionally or alternatively, in some implementations, the second report may identify transactions not listed in the first report. Additionally or alternatively, in some implementations, the second report may identify one or more attributes of each of the transactions listed in it. Additionally or alternatively, in some implementations, the first report may be the same or similar to the analytics report 323. The second report may be received from the analytics platform 110 or another source.

At step 1206, one or more errors are identified in the first report based on information found in the second report. In some implementations, step 1206 may be performed in the same or similar manner to steps 910 and/or 1006.

At step 1208, an action is taken in response to the one or more errors being identified. In some implementations, the action may include outputting an indication of at least one of the errors on an output device that is part of the device/system executing the process 1200 (e.g., display screen, speaker, printer, etc.). Additionally or alternatively, in some implementations, the action may be one that prevents an advertiser from being overcharged as a result of the errors in the first report.

In instances in which the process 1200 is performed by the AVP 112, step 1208 may be performed in the same or similar manner as step 912. In instances in which the process 1200 is performed by the advertising platform 108, the advertising platform 108 may generate a corrected version of the first report, which doesn't include the errors, and transmit the corrected version of the first report to the advertiser.

In instances in which the process 1200 is performed by the analytics platform 110, the analytics platform 110 may transmit an indication of at least some of the errors to the device/system from which the first report is received or which has generated the first report.

Additionally or alternatively, in instances in which the process 1200 is performed by the analytics platform 110, the analytics platform 110 may transmit a corrected version of the first report to the device/system from which the first report is received or which has generated the first report. Additionally or alternatively, in instances in which the process 1200 is performed by the analytics platform 110, the analytics platform 110 may transmit an indication of at least some of the errors to a device associated with an advertiser for which the first report is intended (e.g., the advertiser client device 106). Additionally or alternatively, in instances in which the process 1200 is performed by the analytics platform 110, the analytics platform 110 may transmit a stop payment request to a payment system that is configured to pay one or more charges in the first report instructing the payment system to withhold payment on all transactions identified in the first report or withhold payment on only transactions whose respective records contain errors.

In instances in which the process 1200 is performed by the advertiser client device 106, the advertiser client device 106 may transmit an indication of at least some of the errors to the device/system from which the first report is received or which has generated the first report. Additionally or alternatively, in instances in which the process 1200 is performed by the advertiser client device 106, the advertiser client device 106 may transmit a corrected version of the first report to the device/system from which the first report is received or which has generated the first report. Additionally or alternatively, in instances in which the process 1200 is performed by the advertiser client device 106, the advertiser client device 106 may transmit a stop payment request to a payment system that is configured to pay one or more charges in the first report instructing the payment system to withhold payment on all transactions identified in the first report or withhold payment on only transactions whose respective records contain errors.

Figure 13:
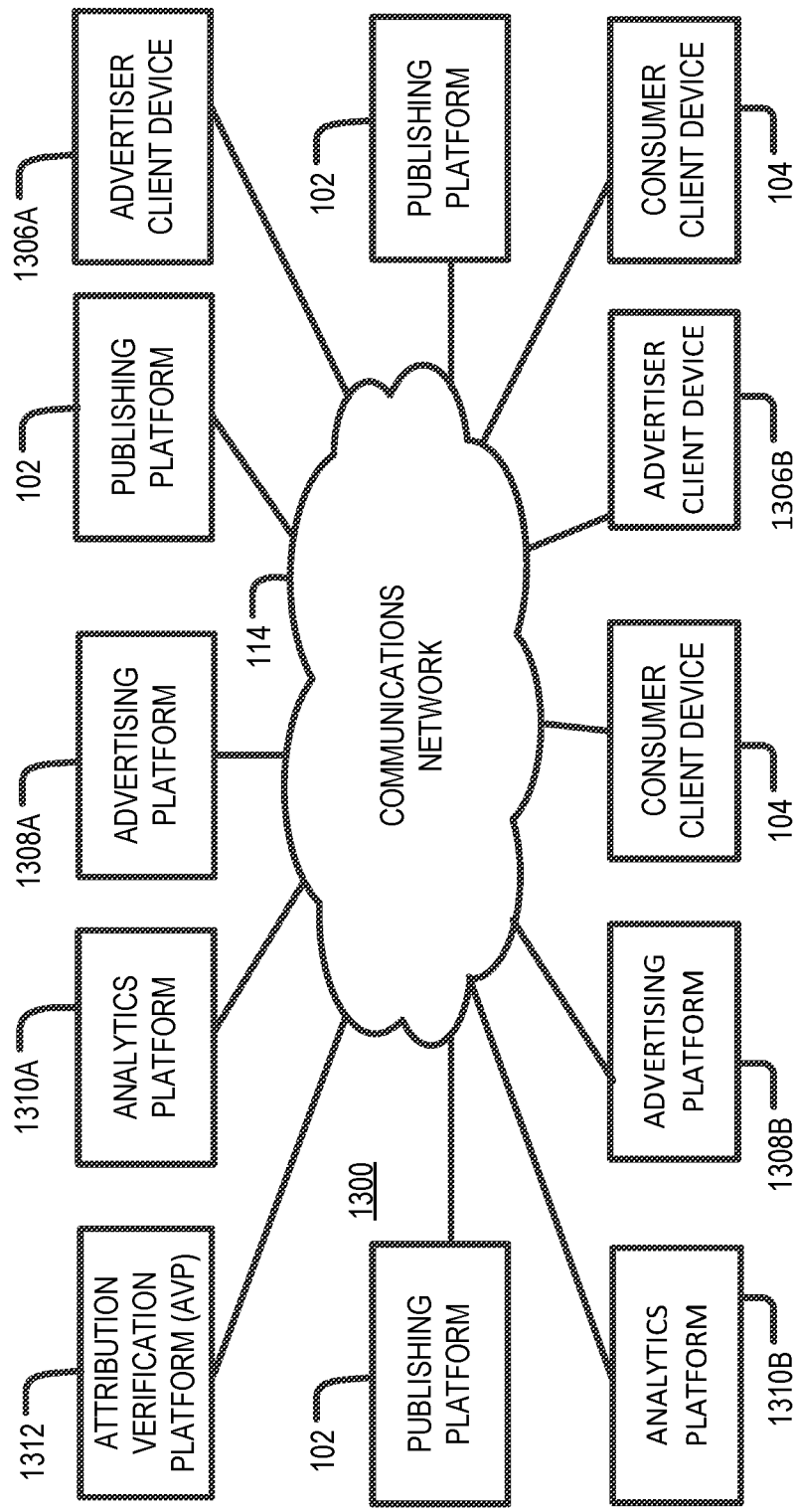
FIG. 13 is a diagram of an example of a system, according to aspects of the disclosure.

FIG. 13 is a diagram of an example a system 1300, according to aspects of the disclosure. The system 1300 may be nearly identical to the system 1300, except for including a plurality of different advertising platforms 1308, a plurality of different analytics platforms 1310, and an attribution verification platform (AVP) 1312. All nodes in the system 1300 are connected to one another via the communications network 114, as shown.

Any of the client devices 1306 may be the same or similar to the advertiser client device 106. Any of the client devices 1306 may be used by an advertiser to create an account with the AVP 1312 and sign up for services provided by the AVP 1312.

Any of the advertising platforms 1308 may be the same or similar to the advertising platform 108, which is discussed above with respect to FIG. 1. For example, in some implementations, any of the advertising platforms may include one or more servers that are configured to act as an intermediary between the publishing platform and the advertiser. More particularly, the servers in each of the advertising platforms 1308 may be configured to perform at least some of the following tasks: (i) receive, over the communications network 114, an order for the placement of an advertisement from the advertiser client device; (ii) cause at least one of the publishing platforms 102 to display the advertisement; (iii) receive an attribution report that is generated by the AVP 1312, (iv) receive a payment for one or more transactions identified in the attribution report, and (v) disburse different portions of the payment to publishers to which the transactions identified in the advertising report are attributed.

Any of the analytics platforms 1310 may be the same or similar to the analytics platform 110, which is discussed above with respect to FIG. 1. Additionally or alternatively, in some implementations, any of the analytics platforms 1310 may include one or more servers that are configured to collect and provide analytics related to the presentation of advertisements placed by the advertising platform 108 on one or more publishing platforms 102. Additionally or alternatively, in some implementations, any of the analytics platforms 1310 may be the same or similar to the GOOGLE ANALYTICS system that is currently fielded by GOOGLE, or the ADOBE ANALYTICS system fielded by ADOBE.

In the example of FIG. 13, the advertising platforms 1308 are not tasked with generating attribution reports for various advertisers that work with them. Rather, this task is delegated to the AVP 1312. As noted above, the attribution reports include various charges that are required to be paid by publishers in the form of commissions and fees. Some of those charges may be directly payable to the advertising platforms 1308, which in some circumstances, may create an incentive for the advertising platforms 1308 to exaggerate the charges in order to maximize profit. Accordingly, outsourcing the calculation of those charges to the AVP 1312 may help ensure the accuracy of the charges that are paid by advertisers. Furthermore, the AVP 1312 may provide advertisers with a centralized platform that allows them to manage their dealings with a number of different advertising platforms from the same place, thereby increasing the advertisers' productivity. Furthermore, in some implementations, the advertising platforms 1308 may lack the technical capability to obtain all of the analytics data that is necessary for calculating various commissions and fees and/or the preparation of attribution reports. In such instances, the AVP 1312 may be better suited for collecting this data, as it may have the capability to interface with a larger number of different analytics platforms, than the advertising platforms 1308.

In some implementations, the AVP 1312 may include one or more servers that are configured to receive an analytics report provided by one of the analytics platforms 1310, receive one or more attribution rules from at least one of the advertiser client devices 1306, generate an attribution report based on the analytics report and the attribution rules, and transmit the attribution report to one of the advertising platforms 1308. The external advertising report may identify commission amounts and/or other fees that are owed by the advertiser to the recipient advertising platform 1308 and publishing platforms 102 for the presentation of advertisements on behalf of the advertiser. Upon receiving the external attribution report and payment, the recipient advertising platform 1308 may disburse the fees and commissions identified in the report to different advertisers.

Figure 14:
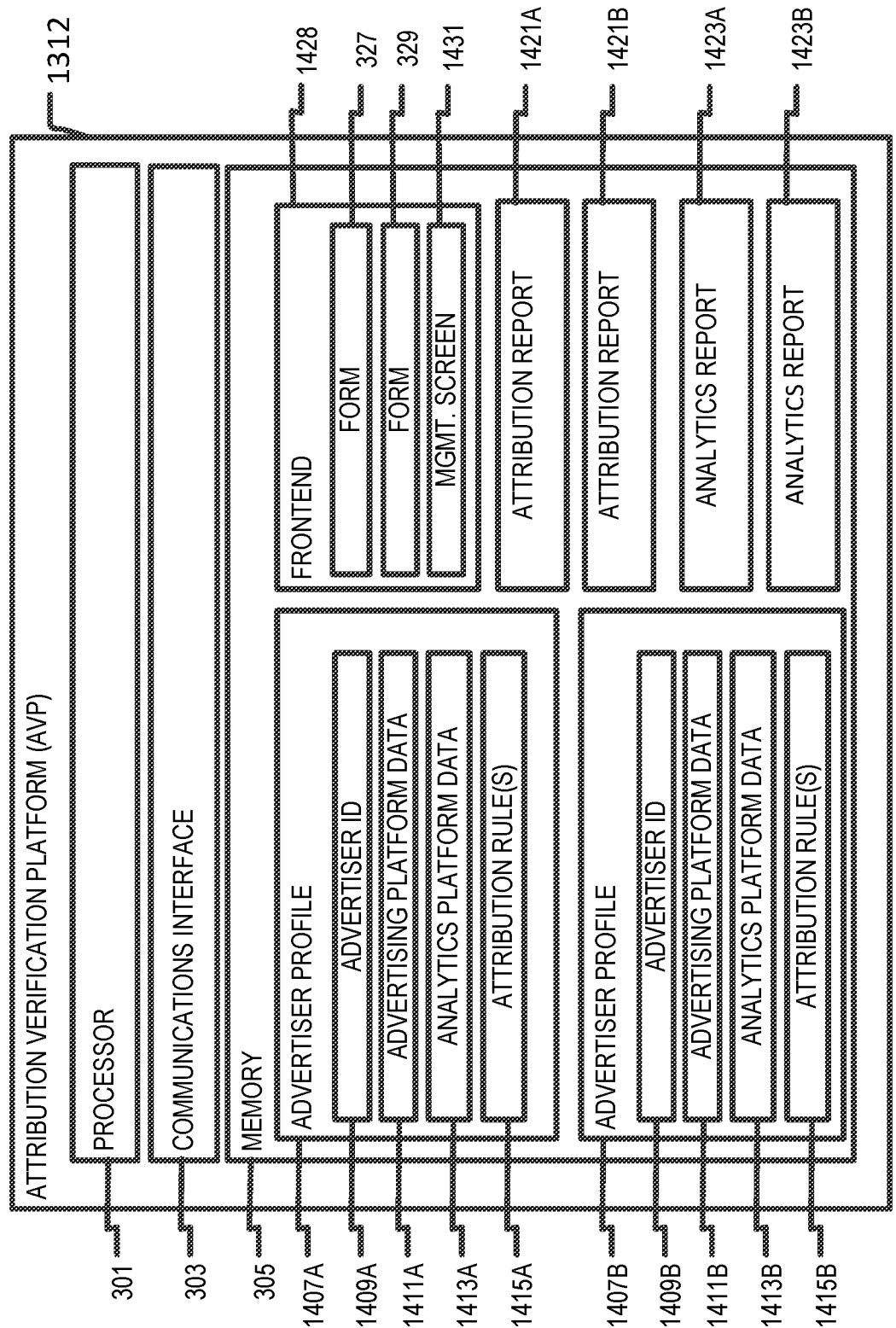
FIG. 14 is a diagram of an example of an attribution verification platform, according to aspects of the disclosure.

FIG. 14 is a diagram of an example of the AVP 1312, in accordance with one particular implementation. As illustrated, the AVP 1312 may have the same or similar hardware structure as the AVP 112. As noted above, unlike the AVP 112, the AVP 1312 may be configured to provide third-party attribution services to advertising platforms, publishers, and/or advertisers. To perform these services, the AVP 1312 may utilize advertiser profiles 1407 that are stored in the memory 305. Although in the present example, the advertiser profiles 1407 are stored on the AVP 1312, it will be understood that at least one of the advertiser profiles 1407 may be stored on any node in the system 1300, such as any of the advertiser client devices 1306, any of the publishing platforms 102, any of the analytics platforms 1310A, etc. In this regard, the functions performed by the AVP 1312 in the example of FIGS. 13-17, in some implementations, may be performed by another node in the system 1300.

In the present example, the AVP 1312 includes two advertiser profiles 1407 stored in the memory 305—namely advertiser profile 1407A and 1407B. Each of the advertiser profiles may include information associated with a different advertiser. In some implementations, the advertiser profile 1407A may include information corresponding to an advertiser associated with the advertiser client device 1306A, while the advertiser profile 1407B may include information associated with the advertiser client device 1306B. In the present example, the advertiser profile 1407A may include an advertiser ID 1409A, an advertising platform data record 1411A, an analytics platform data record 1413A, and attribution rules 1415A. The advertiser profile 1407B may include an advertiser ID 1409B, an advertising platform data record 1411B, an analytics platform data record 1413B, and attribution rules 1415B.

Any of the advertiser IDs 1409 may be the same or similar to the advertiser ID 309. More particularly, each of the advertiser IDs 1409 may include at least one of a number, a string, or an alphanumerical string that is capable of identifying an advertiser that is using the services provided by the AVP 1312. In the present example, the advertiser ID 1409A may include information identifying an advertiser that is associated with the advertiser client device 1306A. Similarly, the advertiser ID 1409B may include information identifying an advertiser that is associated with the advertiser client device 1306B.

Any of the advertising platform data records 1411 may be the same or similar to the advertising platform data record 311. In some implementations, the record 1411A may include information corresponding to the advertising platform 1308A. As such, the record 1411A may include a URL and/or another type of address that can be used to establish a connection with the advertising platform 1308A and upload the attribution report 1421A onto the advertising platform 1308A over the connection. Furthermore, in some implementations, the advertising platform record 1411A may include one or more credentials that are needed to establish the connection. In some implementations, the credentials may include one or more of a username, a secure key, a password, and/or any other suitable type of credential that is needed by the AVP 1312 to authenticate itself before the advertising platform 1308A in order for it to be permitted to upload onto the advertising platform 1308A the attribution report 1421A.

In some implementations, the advertising record 1411B may include information corresponding to the advertising platform 1308B. As such, the advertising platform record 1411B may include a URL and/or another type of address that can be used to establish a connection with the advertising platform 1308B and upload the attribution report 1421B onto the advertising platform 1308B over the connection. Furthermore, in some implementations, the advertising platform record 1411B may include one or more credentials that are needed to establish the connection. In some implementations, the credentials may include one or more of a username, a secure key, a password, and/or any other suitable type of credential that is needed by the AVP 1312 to authenticate itself before the advertising platform 1308B in order for it to be permitted to upload on the advertising platform 1308B the attribution report 1421B.

Any of the analytics platform data records 1413 may be the same or similar to the advertising platform data record 311. In the present example, the analytics platform data record 1413A includes information associated with the advertising platform 1308A, and the advertising analytics platform data record 1413B includes information associated with the analytics platform 1310B.

In some implementations, the analytics platform data record 1413A may include one or more of an ID corresponding to the analytics platform 1310A and one or more credentials for retrieving an analytics report 1423A from the analytics platform 1310A. The analytics platform ID may include any suitable number, string, and/or alphanumerical identifier that is capable of identifying the analytics platform 1310A. In some implementations, the analytics platform ID may include a URL and/or another type of address that can be used by the AVP 1312 to connect to the analytics platform 1310A and retrieve the analytics report 1423A (which is generated by the analytics platform 1310A). The advertising platform credentials may include one or more of a username, a secure key, a password, and/or any other suitable type of credential that is needed by the AVP 1312 to authenticate itself before the analytics platform 1310A before it is permitted to retrieve the analytics report 1423A from the analytics platform 1310A.

In some implementations, the analytics platform data record 1413B may include one or more of an ID corresponding to the analytics platform 1310B and one or more credentials for retrieving an analytics report 1423B from the analytics platform 1310B. The analytics platform ID may include any suitable number, string, and/or alphanumerical identifier that is capable of identifying the analytics platform 1310B. In some implementations, the analytics provider ID may include a URL and/or another type of address that can be used by the AVP 1312 to connect to the analytics platform 1310B and retrieve the analytics report 1423B (which is generated by the analytics platform 1310B). The advertising platform credentials may include one or more of a username, a secure key, a password, and/or any other suitable type of credential that is needed by the AVP 1312 to authenticate itself before the analytics platform 1310B before it is permitted to retrieve the analytics report 1423B from the analytics platform.

Any of the attribution rules 1415 may be the same or similar to the attribution rules 315. In the present example, the attribution rules 1415A may include one or more attribution rules for attributing commissions that are due to be paid by the advertiser associated with the profile 1407A for transactions that have resulted from the presentation of advertisements, by the advertising platform 1308A, on any of the publishing platforms 102. Furthermore, in the present example, the attribution rules 1415B may include one or more rules for attributing commissions that are due to be paid by the advertiser associated with the profile 1407B for transactions that have resulted from the presentation of advertisements, by the advertising platform 1308B, on any of the publishing platforms 102. Additionally or alternatively, any of the attribution rules 1415A or 1415B may include logic for calculating any suitable metric of the performance of an advertisement.

In some implementations, any of the attribution rules 1415A may include logic for calculating a fee that is owed by the advertiser to the advertising platform 1308A. In some implementations, the logic may include a mathematical expression. Additionally or alternatively, in some implementations, the logic may include one or more processor-executable instructions (e.g., a script), which when executed by at least one processor causes the at least one processor to calculate the fee. In some implementations, the processor-executable instructions may include at least two different expressions (e.g., conditional expressions) for calculating the fee. For example, the first expression may provide for the fee to be calculated using a first formula (which is a function of a first transaction attribute value), when the first transaction attribute value is available in the analytics report 1423A. As another example, the second expression may provide for the fee to be calculated using a second formula (which is a function of a second transaction attribute value, and which does not use the first attribute value), when the first transaction attribute value is not available in the analytics report 1423A and the second transaction attribute value is available in the analytics report 1423A.

Additionally or alternatively, in some implementations, any of the attribution rules 1415A may include logic for calculating a commission that is owed by the advertiser to one or more publishing platforms. In some implementations, the logic may include a mathematical expression. Additionally or alternatively, in some implementations, the logic may include one or more processor-executable instructions (e.g., a script), which when executed by at least one processor causes the at least one processor to calculate the commission. In some implementations, the processor-executable instructions may include at least two different expressions (e.g., conditional expressions) for calculating the commission. For example, the first expression may provide for the commission to be calculated using a first formula (which is a function of a first transaction attribute value), when the first transaction attribute value is available in the analytics report 1423A. As another example, the second expression may provide for the commission to be calculated using a second formula (which is a function of a second transaction attribute value, and which does not use the first attribute value), when the first transaction attribute value is not available in the analytics report 1423A and the second transaction attribute value is available in the analytics report 1423A. Similar to the attribution rules 1415A, the attribution rules 1415B may also include logic for calculating at least one of fees and commissions associated with the presentation of advertisements. The logic in the attribution rules 1415B may include a mathematical expression and/or conditional expressions that are predicated on the availability of specific transaction attribute values in the analytics report 1423B.

In some implementations, the attribution rules 1415A may include at least one attribution rule that is not part of the attribution rules 1415B, or vice versa. Thus, in some instances, the attribution rules 1415A and 1415B may include attribution rule sets that are at least partially disjoint or otherwise different. In some implementations, any of the attribution rules 1415A and 1415B may include one or more of the following attribution rules:

(i) award the publisher the full commission when an ad presented by the publisher has generated the last click (or another type of selection) in a stream of clicks (or other selections) leading to the completion of a transaction;

(ii) award the publisher a split commission when an ad presented by the publisher has generated the last click (or another type of selection) in a stream of clicks (or other selections) leading to the completion of a transaction;

(iii) award the publisher the full commission when an ad presented by the publisher has generated the first click (or another type of selection) in a stream of clicks (or other selections) leading to the completion of a transaction;

(iv) award the publisher a split commission when an ad presented by the publisher has generated the first click (or another type of selection) in a stream of clicks (or other selections) leading to the completion of a transaction;

(v) award the publisher the full commission when an ad presented by the publisher has generated a click (or another type of selection) at another position in a stream of clicks (or other selections) leading to the completion of a transaction;

(vi) award the publisher a split commission when an ad presented by the publisher has generated a click (or another type of selection) at another position in a stream of clicks (or other selections) leading to the completion of a transaction;

(vii) award the publisher full commission when an ad presented by the publisher has generated a click leading to the completion of a transaction; and (iv) award the publisher a split commission when an ad presented by the publisher has generated a click (or another type of selection) leading to the completion of a transaction.

Any of the attribution reports 1421 may be the same or similar to the attribution report 321. In some implementations, each of the attribution reports 1421 may include one or more transaction records. Each of the records may correspond to a different respective transaction. In some implementations, each of the records may include the values for one or more attributes of the record's respective transaction. More particularly, each record may include: an advertisement ID identifying the advertisement which the record is associated with; a transaction ID identifying the transaction which has been completed as a result of the advertisement being presented (e.g., displayed) to a viewer; a timestamp identifying the time when the transaction was completed; a transaction type ID identifying the type of the transaction; a publisher ID identifying the publisher and/or publishing platform on which the advertisement was presented; a publisher medium ID identifying the website (or another electronic medium) where the advertisement was presented; a transaction amount identifying an amount of money paid for the transaction to be completed; a publisher commission that is owed to the publisher for the completion of the transaction; and a fee that is owed to the attribution report's 1421 corresponding advertising platform.

In some implementations, the attribution report 1421A may be generated by the AVP 1312 for use by the advertising platform 1308A based on the analytics report 1423A and the attribution rules 1415A. In some implementations, the attribution report may include one or more records corresponding to different transactions whose completion is attributable to advertisements that were placed on one or more publishing platforms 102 by the advertising platform 1308A. In the present example, the attribution report 1421A is generated on behalf of the advertiser associated with the advertiser profile 1407A. However, alternative implementations are possible in which the attribution report 1421A is generated on behalf of the advertiser associated with the advertiser profile 1407B. Additionally or alternatively, in some implementations, the attribution report 1421A may be generated using the process 1600 which is discussed further below with respect to FIG. 16.

In some implementations, the attribution report 1421B may be generated by the AVP 1312 for use by the advertising platform 1308B based on the analytics report 1423B and the attribution rules 1415A. In some implementations, the attribution report may include one or more records corresponding to different transactions whose completion is attributable to advertisements that were placed on one or more publishing platforms 102 by the advertising platform 1308B. In the present example, the attribution report 1421B is generated on behalf of the advertiser associated with the advertiser profile 1407A. However, alternative implementations are possible in which the attribution report 1421B is generated on behalf of the advertiser associated with the advertiser profile 1407B. Additionally or alternatively, in some implementations, the attribution report 1421B may be generated using the process 1600 which is discussed further below with respect to FIG. 16.

In the present example, as illustrated in FIG. 15, the attribution report 1421A is identical to the attribution report 321. However, alternative implementations are possible in which the attribution report may lack values for at least one of the attribute types illustrated in the example of FIG. 15. Furthermore, alternative implementations are possible in which the attribution report 1421A includes the values for additional attributes that are not shown in the example of FIG. 15. For example, any of the transaction records 402 in the attribution report may include a medium that is used to deliver an advertisement identified in the record and/or a shopper ID identifying the particular shopper that completed the record's 402 corresponding transaction. The present disclosure is not limited to any specific type of information being included in the attribution report 1421A. As noted above, in some implementations, the attribution report may include an indication of any suitable metric of the performance of the advertisement that can be used by an advertiser to assess the value of the advertisement to the advertiser's business. As such, the attribution report 1421A may or may not include indications of charges that are payable by an advertiser to one or more entities.

Any of the analytics reports 1423 may be the same or similar to the analytics report 323. The analytics report 1423A may identify one or more transactions associated with the advertiser represented by the advertiser profile 1407A. In some implementations, those transactions may include purchases of goods or services made from the advertiser or an entity associated with the advertiser. For each of the transaction, the analytics report 1423A may include the values of one or more attributes associated with the transaction that are usable in calculating the commissions and fees associated with the transaction, such as the publisher commission 418 and the advertising platform fee 420. Those attribute values may identify the total value of each transaction, the advertising platform to which the transaction is attributable, one or more publishing platforms to which the transaction is attributable, and/or any other suitable type of information.

Although in the present example, the analytics report 1423A is retrieved by the AVP 1312 from the analytics platform 1310A, in some implementations the analytics report may be generated by the AVP 1312. More particularly, in some implementations, the AVP 1312 may obtain two or more different analytics reports and stitch the reports (or portions thereof) together to produce the analytics report 1423A. For example, in some implementations, the AVP 1312 may generate the analytics report 1423A by appending (or otherwise combining) at least a first portion of a first analytics report to at least a second portion of a second analytics report. In the present example, the first analytics report and the second analytics report are generated by different analytics platforms. However, alternative implementations are possible in which the first analytics report and the second report are generated by the same analytics platform.

The first portion of the first analytics report may be selected for inclusion in the analytics report 1423A based on containing information about a transaction that is attributable to the presentation (or selection) of one or more advertisements associated with the advertiser associated with the profile 1407A. Specifically, the first portion of the first analytics report may be selected for inclusion in the analytics report 1423A based on containing one or more first attribute values that are needed to apply one or more of the attribution rules 1415A in order to calculate a commission, an advertising platform fee, and/or another value for the transaction.

The second portion of the second analytics report may be selected for inclusion in the analytics report 1423A based on containing information about a transaction that is attributable to the presentation (or selection) of one or more advertisements associated with the advertiser associated with the profile 1407A. Specifically, the second portion of the second analytics report may be selected for inclusion in the analytics report 1423A based on containing one or more second attribute values that are needed to apply one or more of the attribution rules 1415A in order to calculate a commission, an advertising platform fee, and/or another value for the transaction. The one or more second attribute values may be attribute values that are not present in the first analytics report.

The analytics report 1423B may include one or more transactions associated with the advertiser represented by the advertiser profile 1407B. In some implementations, those transactions may include purchases of goods or services made from the advertiser or an entity associated with the advertiser. For each of the transaction, the analytics report 1423B may include the values of one or more attributes associated with the transaction that are usable in calculating the commissions and fees, such as the publisher commission 418 and the advertising platform fee 420. Those attribute values may identify the total value of each transaction, the advertising platform to which the transaction is attributable, one or more publishing platforms to which the transaction is attributable, and/or any other suitable type of information. Although in the present example, the analytics report 1423B is retrieved by the AVP 1312 from the analytics platform 1310B, alternative implementations are possible in which the analytics report 1423B is generated by the AVP 1312 by combining multiple reports (or portions thereof) in the manner discussed above with respect to the analytics report 1423A.

The frontend 1428 may be the same or similar to the frontend 328. As such, the front end may include one or more forms for specifying, modifying, changing, adding, or deleting any suitable type of information that is part of the advertiser profiles 1407 and/or any suitable type of information that is needed for the generation of attribution report. Furthermore, the frontend 1428 may include 1428 may include a management screen 1431 which may be used by an advertiser to manage a number of different reports that have been generated on behalf of the advertiser and/or submitted to advertising platforms that work with the advertiser. The management screen 1431 is discussed further below with respect to FIG. 17. As used throughout the disclosure, the term "form" may refer to a user interface screen or a portion of a user interface screen that can be presented to the user for the purposes of presenting information to the user and/or receiving input from the user.

Figure 16:
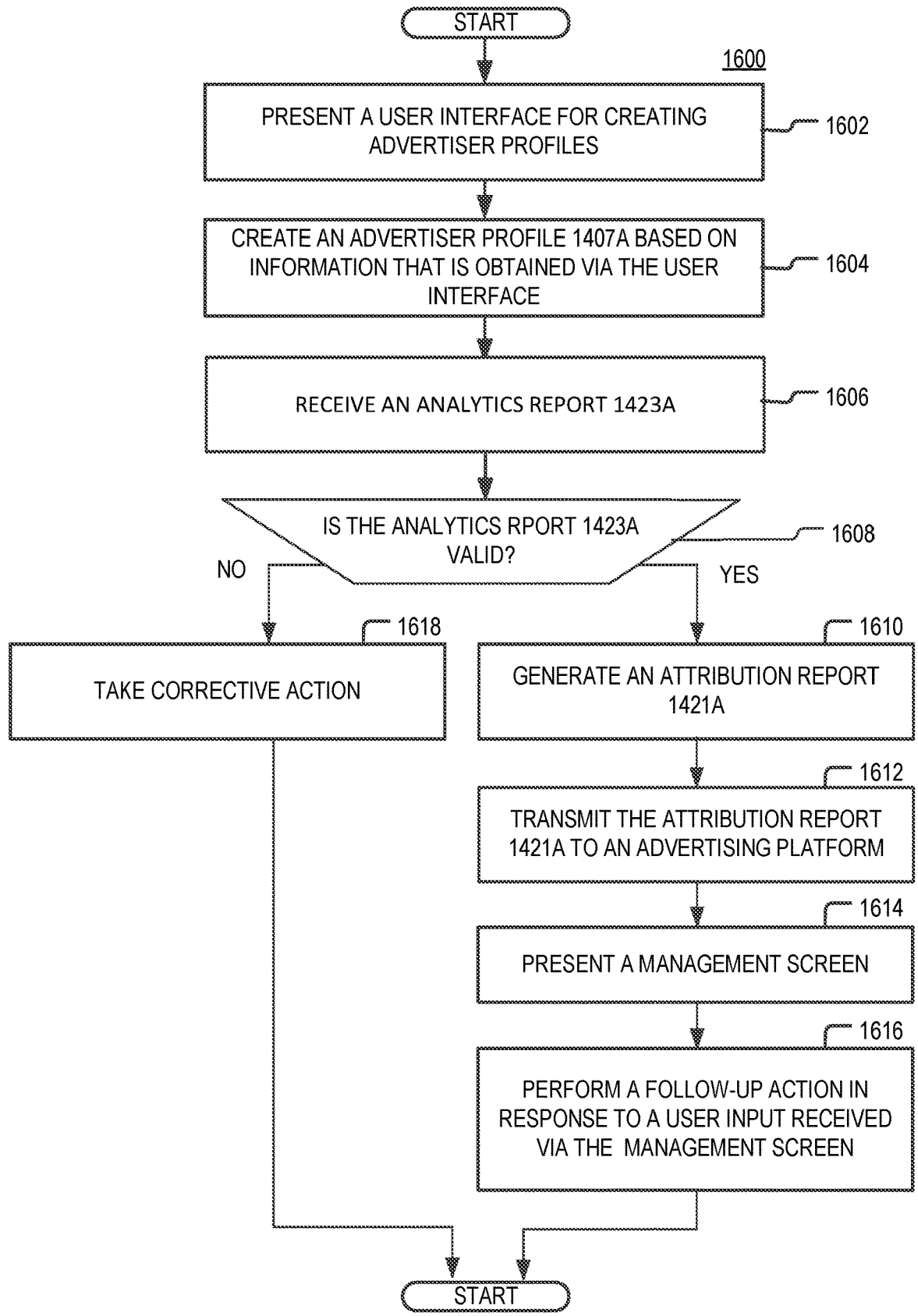
FIG. 16 is a flowchart of an example of a process, according to aspects of the disclosure.

FIG. 16 is a flowchart of an example of a process 1600 for generating attribution reports, according to aspects of the disclosure. Although in the present example, the process 1600 is executed by the AVP 1312, it will be understood that the process 1600 may be executed on any node in the system 1300, such as any of the advertiser client devices 1306, any of the publishing platforms 102, any of the analytics platforms 1310A, etc.

At step 1602, the AVP 1312 presents to the client device 106 a user interface including a first input component for specifying a first credential and a second input component for specifying a second credential. In the present example, the AVP 112 causes the advertiser client device 106 display the forms 327 and/or 329, as discussed above.

At step 1604, the advertiser profile 307 is created based on information that is input into the forms 327 and 329.

At step 1606, the AVP 1312 authenticates itself before the analytics platform 1310A with the first credential and receives the analytics report 1423A from the analytics platform 1310A. In some implementations, the analytics report 1423A may be transmitted automatically to the AVP 1312 without the AVP 1312 having to transmit an explicit request. Additionally or alternatively, in some implementations, the analytics report 1423A may be transmitted to the AVP 1312 following the transmission of a request for it from the AVP 1312 to the advertising platform 1308A.

At step 1608, the AVP 1312 validates the analytics report 1423A. In some implementations, validating the analytics report 1423A may include detecting whether the analytics report provides sufficient information for applying any (or all) of the attribution rules 1415A. In some implementations, for any of the attribution rules 1415A, the AVP 1312 may perform the following steps: (i) identify one or more attribute values that are needed for applying the attribution rule, and (ii) detect whether those attribute values are present in the analytics report 1423A. If the attribute values needed for the application of all attribution rules are present, the process may proceed to step 1610. If the attribute values needed for the application of at least one attribution rule the process may proceed to step 1618.

For example, when an attribution rule may provide that the commission for a transaction resulting from the presentation of an advertisement has to be split between the publishers which generated the three most recent selections (e.g., clicks) of the advertisement prior to the transaction being completed. In such instances, when validating the analytics report 1423A, the AVP 1312 may detect whether the analytics report 1423A identifies the three most recent selections of the advertisement prior to the transaction being completed. If all the three most recent selections are not identified by the analytics report 1423A, the AVP 1312 may detect that the analytics data 1423 does not contain the information necessary for applying the attribution rule. By contrast, if the three most recent selections are identified, the AVP 1312 may detect that the analytics report 1423A contains all information that is necessary for the application of the attribution rule.

At step 1610, the AVP 1312 generates the attribution report 1421A based on one or more of the attribution rules 1415 and the analytics report 1423A.

At step 1612, the AVP 1312 transmits the attribution report 1421A to the advertising platform 1308A. In some implementations, the attribution report 1421A may be transmitted along with a payment of all commissions and fees identified in the attribution report 1421A. In some implementation, upon receiving the attribution report 1421A, the advertising platform 1308A may disburse a respective payment to each of the commission recipients identified in the attribution report 1421A, while retaining for itself all advertising platform fees that are identified in the report.

At step 1614, the AVP 1312 presents the management screen 1431 on the advertiser terminal 1306A. The management screen 1431 may identify one or more attribution reports that have been generated for the advertiser associated with the advertiser profile 1407A. In addition, in some implementations, the management screen 1431 may include one or more input components for performing one or more operation on selected ones of the attribution reports listed in the management screen 1431.

In some implementations, presenting the management screen 1431 may include transmitting HTML code (or another type of code) representing the management screen to the advertiser client device 1306A, which when executed by the advertiser client device 1306A causes the advertiser client device 1306A to display the management screen 1431.

Additionally or alternatively, in some implementations, presenting the management screen 1431 may include transmitting to the advertiser client device 1306A one or more attribute values that are part of the management screen, such as attribution report IDs, attribution report recipient IDs, attribution report status indicators, etc.

At step 1616, the AVP 1312 may perform one or more operations on analytics reports that have been selected on the management screen 1431 by the advertiser. The performance of these operations is discussed further below with respect to FIG. 17.

At step 1618, the AVP 1312 takes corrective action in response to detecting that the analytics report 1423A does not contain sufficient information for applying at least some of the attribution rules 1415A. In some implementations, the action may include transmitting to the advertiser client device 1306A an identification of at least one rule that cannot be applied because the analytics report 1423A includes insufficient information, along with a notification that the rule cannot be applied using the information available in the analytics report 1423A. Additionally or alternatively, in some implementations, the notification may also identify one or more attribute values (or attribute types) that are missing from the analytics report 1423A, which are necessary for the application of the attribution rule. Upon receiving the notification, the advertiser may access the frontend 1428 of the AVP 1312 to delete the rule and recalculate the attribution report 1421A.

Additionally or alternatively, in some implementations, the action may include transmitting to the advertising platform 1308A an indication of the rule along with a notification that the rule can be applied using the information available in the analytics report 1423A. Additionally or alternatively, in some implementations, the action may include retrieving supplemental analytics data from another source (e.g., the advertising platform 1308B) and applying the rule using the supplemental analytics data.

Although in the present example, the process 1600 includes the step 1608 in which the analytics report 1423A is validated, alternative implementations are possible in which this step is omitted. For example, in instances in which the analytics report 1423A is generated by stitching together multiple reports (or portions thereof), the step 1608 may be omitted from the process 1600.

Figure 17:
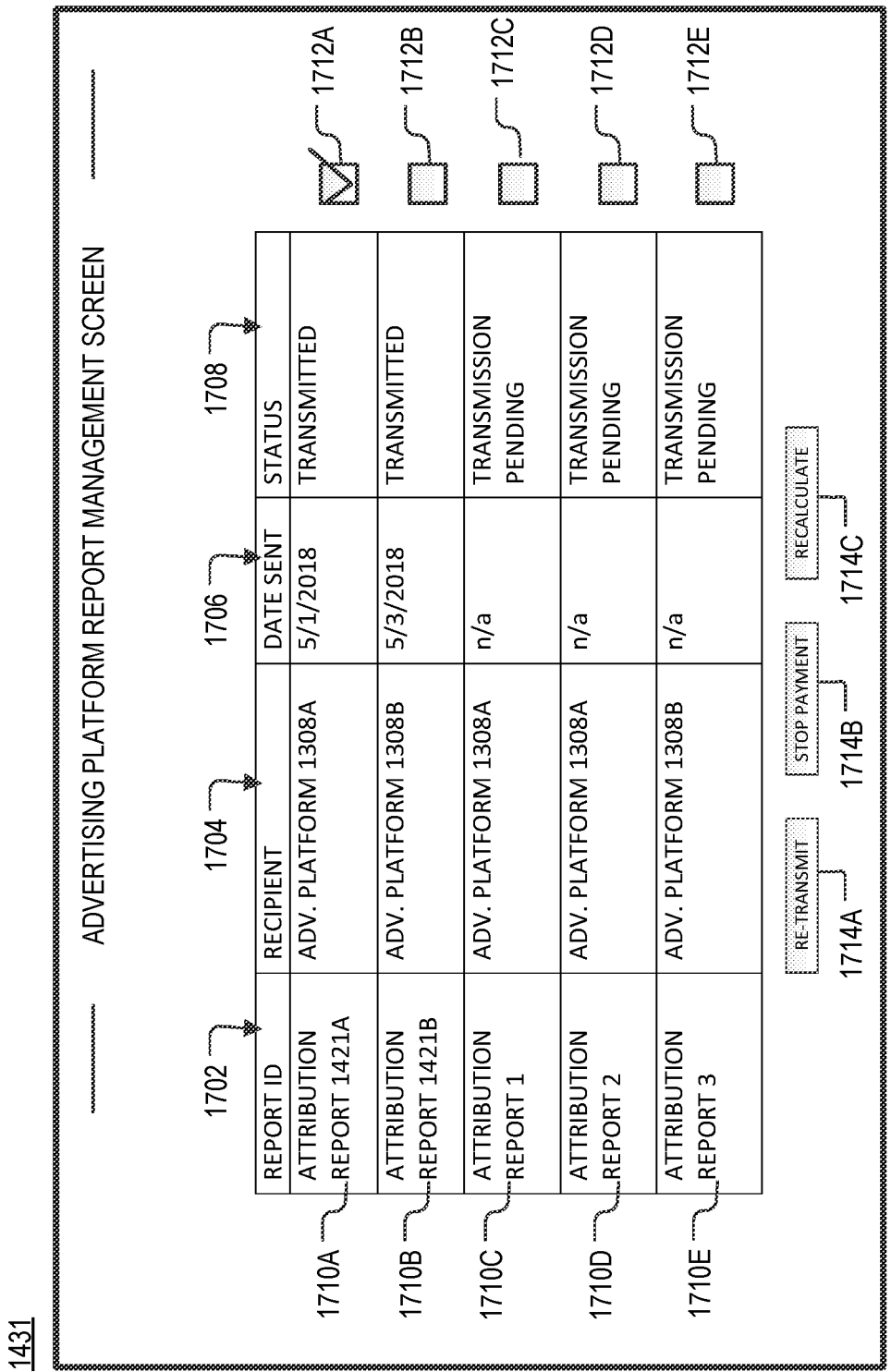
FIG. 17 is a diagram of an example of a form that is part of the user interface of the attribution verification platform of FIG. 14, according to aspects of the disclosure.

FIG. 17 illustrates the management screen 1431 in further detail, in accordance with one particular implementation. As illustrated, the management screen 1431 may include a plurality of attribution report records 1710. Each attribution report record 1710 may correspond to a different attribution report that is generated by the AVP 1312. In some implementations, each record 1710 may include a record ID 1702 for the record's respective attribution report, a recipient ID 1704 identifying the recipient of the respective attribution report, a timestamp 1706 identifying the day (or time) when the respective attribution report was sent, if at all, and a status ID 1708 indicating whether the report has been sent to the respective recipient. Although not shown, for each attribution report, the management screen 1431 may identify the total of commissions that are listed in the attribution report. Additionally or alternatively, in some implementations, for each attribution report, the management screen 1431 may identify the total of all advertising platform fees that are listed in the attribution report. Additionally or alternatively, in some implementations, for each attribution report, the management screen 1431 may identify the total of all commissions and advertising platform fees that are listed in the attribution report.

In some implementations, the management screen 1431 may include a plurality of checkboxes 1712 for selecting different records 1710 (and/or the attribution reports corresponding to the records). In some implementations, each of the checkboxes 1712 may correspond to a different respective record 1710 (or the record's respective attribution report). For example, the checkbox 1712A may correspond to the record 1710A (or the attribution report 1421A). When the checkbox 1712A is checked, the record 1710A (or the attribution report 1421A) may be considered selected. When the checkbox 1712A is not checked, the record 1710A (or the attribution report 1421A) may be considered not selected. As another example, the checkbox 1712B may correspond to the record 1710B (or the attribution report 1421B). When the checkbox 1712B is checked, the record 1710B (or the attribution report 1421B) may be considered selected. When the checkbox 1712B is not checked, the record 1710B (or the attribution report 1421B) may be considered not selected.

In some implementations, the management screen 1431, may include a plurality of input components 1714. Each of the input components 1714 may be a button, a text link, and/or any other suitable type of input component. Each of the input component 1714 may be associated with a different function that can be performed on one or more selected attribution reports.

In some implementations, the input component 1714A may be associated with a "retransmit function." When the input component 1714A is selected (e.g., pressed), the device displaying the management screen 1431 (e.g., the advertiser client device 1306A) may transmit to the AVP 1312 an indication of one or more attribution reports that are selected along with an instruction to re-transmit the reports. In response to receiving the instruction, the AVP 1312 may retransmit the identified reports to their respective recipients.

In some implementations, the input component 1714B may be associated with a "stop-payment function." When the input component 1714B is selected (e.g., pressed), the device displaying the management screen 1431 may transmit to the AVP 1312 an indication of one or more attribution reports that are selected along with an instruction to stop any pending payments that are associated with the reports. In response to receiving the instruction, the AVP 1312 may transmit a different stop-payment instruction for each of the selected attribution reports. The stop payment instruction may be transmitted to the recipients of the selected reports (e.g., the advertising platform 1308A) or to a financial institution that is tasked with disbursing the payments.

In some implementations, the input component 1714C may be associated with a "recalculate function." When the input component 1714C is selected (e.g., pressed), the device displaying the management screen 1431 may transmit to the AVP 1312 an indication of one or more attribution reports that are selected along with an instruction to generate a new version of the report. In response to receiving the instruction, the AVP 1312 may generate a new version of the selected report and transmit the new version of the report's respective recipient. In some implementations, the new version may be generated based on the same attribution rules that are used to generate the current version of the selected report. Additionally or alternatively, in some implementations, the new version may be generated based on one or more attribution rules that are not used in generating the current version of the selected report. Additionally or alternatively, in some implementations, the new version of the attribution report may be generated based on the same analytics report that is used in generating the current version of the selected report. Additionally or alternatively, in some implementations, the new version of the attribution report may be generated based on a different analytics report that the one used to generate the current version of the selected report. After the new version of the attribution report is generated, the new version of the attribution report may be automatically transmitted to the same recipient to which old version of the attribution report was transmitted.

In some implementations, when the input component 1714c is selected, the device displaying the management screen 1431 may display a menu allowing the user to select one or more analytics reports that are available to the AVP 1312. In response to detecting a selection of one or more of the analytics reports, the device displaying the management screen 1431 may transmit to the AVP 1312 an indication of the selected analytics report(s). Afterwards, the AVP 1312 may use the indication to retrieve the selected analytics report(s) from the memory 305 and/or from one of the advertising platforms 1308 and use the retrieved analytics report to generate the new version of the selected attribution report.

In some implementations, when the input component 1714C is selected by an advertiser, the device displaying the management screen 1431 (e.g., the advertiser client device 1306A) may present a menu allowing the advertiser to select and/or specify one or more attribution rules. In response to detecting a selection of one or more of the analytics report, the device displaying the management screen 1431 may transmit to the AVP 1312 an indication of the selected (or specified) attribution rules. Afterwards, the AVP 1312 may use the indication to retrieve the selected (or specified) attribution rules to generate the new version of the attribution report.

FIGS. 1-17 are provided as an example only. At least some of the elements discussed with respect to these figures can be arranged in different order, combined, and/or altogether omitted. Although not shown in the figures, the advertising platform 108 and the analytics platform 110 may each have a hardware structure that is the same or similar to the hardware structure of the AVP 112. When any of the processes discussed throughout the disclosure is performed by one of the analytics platform 110 and the advertising platform 108, the process may be performed by the processor of that platform possibly in conjunction with other hardware. When any of the processes discussed throughout the disclosure is performed by one of the analytics platform 110 and the advertising platform 108, the memory of that platform may store an advertiser profile that is the same or similar to the advertiser profile 307 and/or at least one of an attribution report, an analytics report, and a corrected attribution report. Although in the above examples, the attribution reports are described as being received from an analytics platform, it will be understood that analytics reports can be received from any suitable source, such as advertising platforms, or the advertiser's customer relationship management (CRM) software (e.g., SALESFORCE or the like), etc. Although in the above examples, the attribution rules (e.g., the rules 315 or 1415) include logic for calculating various payable charges, it will be understood that in some implementations may include logic for calculating any suitable metric of the performance of an advertisement. As such, the attribution rules are not limited to including only logic for calculating payable amounts. It will be understood that the provision of the examples described herein, as well as clauses prefaced with "such as," "e.g.", "including", "in some aspects," "in some implementations," and the like should not be interpreted as limiting the disclosed subject matter to the specific examples.

While the present disclosure may have been shown and described with reference to various embodiments thereof, it will be understood by those skilled in the art that various changes in form and details may be made therein without departing from the spirit and scope of the present disclosure as defined by the appended claims and their equivalents. In other words, the various exemplary embodiments disclosed in the present specification and drawings are merely specific embodiments to facilitate an understanding of the various aspects of the present disclosure and are not intended to limit the scope of the present disclosure. Therefore, the scope of the present disclosure is defined not by the detailed description of the disclosure but by the appended claims, and all differences within the scope should be construed as being included in the present disclosure.

The invention claimed is:

1. A system comprising: a memory and at least one processor operatively coupled to the memory, the at least one processor being configured to:
   present a user interface for registering an advertiser with the system, the user interface including a first input component for inputting an identifier for a first advertising platform, a second input component for inputting an identifier for the advertiser, and a third input component for at least in part specifying an attribution rule that includes logic for calculating a fee that is owed by the advertiser to the first advertising platform;
   generate an advertiser profile including the identifier for the advertiser, the identifier for the first advertising platform, and the attribution rule, and store the advertiser profile in the memory;
   obtain at least one analytics report including a plurality of first transaction records, each first transaction record corresponding to a respective transaction and a respective advertisement associated with the respective transaction and the advertiser;
   wherein when the at least one analytics report includes a plurality of analytics reports, selecting at least one of the plurality of analytics reports or stitching together at least portions of the plurality of analytics reports and identifying inconsistencies between the plurality of analytics reports;
   generate an attribution report based on the analytics report and the attribution rule, the attribution report including a plurality of second transaction records, each of the second transaction records corresponding to a same transaction as at least one of the first transaction records, and each of the second transaction records including an indication of a fee that is owed to the first advertising platform by the advertiser, the fee being calculated by executing the attribution rule using information that is part of the analytics report;
   validate the analytics report, wherein validation of the analytics report includes:
      a determination of an error in the analytics report and correcting the analytics report; and
      a determination of whether the attribution rule is applicable, wherein when the determination is that the attribution rule is not applicable, taking a corrective action, the determination that the attribution rule is not applicable including when the analytics report is missing information that is necessary for the application of the attribution report;
   transmit the attribution report to the first advertising platform, wherein:

the logic for calculating the fee that is owed by the advertiser includes processor-executable code for calculating the fee, wherein the fee that is owed by the advertiser to the first advertising platform includes a mathematical expression for calculating the fee; and the processor-executable code includes:
- a first conditional expression for calculating the fee based on a first transaction attribute value when the first transaction attribute value is provided by the analytics report; and
- a second conditional expression for calculating the fee based on a second transaction attribute value when the first transaction attribute value is not provided by the analytics report, wherein the first transaction attribute is different from the second transaction attribute value.

2. The system of claim 1, wherein the attribution rule is specified by the advertiser.

3. The system of claim 1, wherein the attribution rule further includes logic for calculating a commission that is owed by the advertiser to a publishing platform that has been caused by the first advertising platform to present one or more advertisements that are associated with the advertiser.

4. The system of claim 3, wherein the logic for calculating the commission includes a mathematical expression for calculating the commission.

5. The system of claim 3, wherein the logic for calculating the commission includes processor-executable code for calculating the fee, the processor-executable code including a first conditional expression for calculating the fee based on a first transaction attribute value when the first transaction attribute value is provided by the analytics report, and a second conditional expression for calculating the fee based on a second transaction attribute value when the first transaction attribute value is not provided by the analytics report.

6. The system of claim 1, wherein each of the first transaction records corresponds to a different sale of a product that is advertised using the respective advertisement of the first transaction record.

7. The system of claim 1, wherein obtaining the analytics report includes receiving the analytics report from an analytics platform.

8. The system of claim 1, wherein obtaining the analytics report includes receiving a first analytics report from a first analytics platform, obtaining a second analytics report from a second analytics platform, and generating the analytics report based on the first analytics report and the second analytics report.

9. The system of claim 8, wherein:
generating the analytics report includes: identifying a first attribute value and a second attribute value that are needed for applying the attribution rule, identifying a first portion of the first analytics report that includes the first attribute value, and identifying a second portion of the second analytics report that includes the second attribute value; and
generating the analytics report includes combining the first portion of the attribution report with the second portion of the second analytics report to generate the analytics report.

10. The system of claim 9, wherein the attribution report is generated only when the analytics report is successfully validated, and the at least one processor is further configured to transmit to the advertiser a notification that the attribution rule cannot be executed based on the analytics report, the notification identifying at least one attribute value that is missing from the analytics report and which is necessary for executing the attribution rule.

11. The system of claim 1, wherein:
the at least one processor is further configured to present a management screen including a first record and a second record, the first record corresponding to the attribution report, and the second record corresponding to another attribution report;
wherein the attribution report includes a plurality of transaction records, each transaction record corresponding to a different transaction resulting from a presentation of an advertisement associated with the advertiser and first advertising platform; and
wherein the other attribution report includes a plurality of transaction records, each transaction record corresponding to a different transaction resulting from a presentation of an advertisement associated with the advertiser and a second advertising platform that is different from the first advertising platform.

12. The system of claim 1, wherein presenting the user interface includes transmitting, to a client device associated with the advertiser, processor-executable code which when executed by the client device causes the client device to render the user interface on a display of the client device.

13. The system of claim 1, wherein:
the memory is configured to store a plurality of advertiser profiles, each advertiser profile including an identifier for a different respective advertiser and a respective attribution rule that is specified by the respective advertiser for calculating fees and commissions resulting from a presentation of advertisements on behalf of the respective advertiser;
the at least one processor is configured to calculate a different attribution report for each of the of the advertiser profiles based on the respective attribution rule that is part of that advertising profile and transmit the attribution report to an advertising platform that is specified by the advertiser profile.

14. A method comprising:
presenting a user interface including a first input component for inputting an identifier for a first advertising platform, a second input component for inputting an identifier for an advertiser, and a third input component for at least in part specifying an attribution rule that includes logic for calculating a fee that is owed by the advertiser to the first advertising platform;
generating an advertiser profile including the identifier for the advertiser, the identifier for the first advertising platform, and the attribution rule, and store the advertiser profile in a memory;
obtaining at least one analytics report including a plurality of first transaction records, each first transaction record corresponding to a respective transaction and a respective advertisement associated with the respective transaction and the advertiser;
wherein when the at least one analytics report includes a plurality of analytics reports, selecting at least one of the plurality of analytics reports or stitching together at least portions of the plurality of analytics reports and identifying inconsistencies between the plurality of analytics reports;
generating an attribution report based on the analytics report and the attribution rule, the attribution report including a plurality of second transaction records, each of the second transaction records corresponding to a same transaction as at least one of the first transaction records, and each of the second transaction records including an indication of a fee that is owed to the first advertising platform by the advertiser, the fee being calculated by executing the attribution rule using information that is part of the analytics report;

validating the analytics report, wherein validation of the analytics report includes:

a determination of an error in the analytics report and correcting the analytics report; and a determination of whether the attribution rule is applicable, wherein when the determination is that the attribution rule is not applicable, taking a corrective action, the determination that the attribution rule is not applicable including when the analytics report is missing information that is necessary for the application of the attribution report;

transmitting the attribution report to the first advertising platform, wherein:

the logic for calculating the fee that is owed by the advertiser includes processor-executable code for calculating the fee, wherein the fee that is owed by the advertiser to the first advertising platform includes a mathematical expression for calculating the fee; and the processor-executable code includes:

a first conditional expression for calculating the fee based on a first transaction attribute value when the first transaction attribute value is provided by the analytics report; and a second conditional expression for calculating the fee based on a second transaction attribute value when the first transaction attribute value is not provided by the analytics report, wherein the first transaction attribute is different from the second transaction attribute value.

15. The method of claim 14, wherein the attribution rule is specified by the advertiser.

16. The method of claim 14, wherein the attribution rule further includes logic for calculating a commission that is owed by the advertiser to a publishing platform that has been caused by the first advertising platform to present one or more advertisements that are associated with the advertiser.

* * * * *

UNITED STATES PATENT AND TRADEMARK OFFICE
CERTIFICATE OF CORRECTION

PATENT NO. : 10,733,632 B2  
APPLICATION NO. : 16/057134  
DATED : August 4, 2020  
INVENTOR(S) : Stephanie Harris et al.

Page 1 of 1

It is certified that error appears in the above-identified patent and that said Letters Patent is hereby corrected as shown below:

On the Title Page

Item (72) Inventor should be corrected to read:  
Stephanie Harris, Rosyln, NY (US)  
Thomas Rathbone, Mount Airy, MD (US)

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*